(12) United States Patent
Park et al.

(10) Patent No.: US 9,590,235 B2
(45) Date of Patent: *Mar. 7, 2017

(54) MATERIAL FOR LITHIUM SECONDARY BATTERY OF HIGH PERFORMANCE

(71) Applicant: LG Chem, Ltd., Seoul (KR)

(72) Inventors: Hong-Kyu Park, Daejeon (KR); Sun sik Shin, Daejeon (KR); Sin young Park, Daejeon (KR); Ho suk Shin, Seoul (KR); Jens M. Paulsen, Chungcheongnam-do (KR)

(73) Assignee: LG Chem, Ltd. (KR)

( * ) Notice: Subject to any disclaimer, the term of this patent is extended or adjusted under 35 U.S.C. 154(b) by 63 days.

This patent is subject to a terminal disclaimer.

(21) Appl. No.: 14/614,603

(22) Filed: Feb. 5, 2015

(65) Prior Publication Data

US 2015/0147654 A1    May 28, 2015

Related U.S. Application Data

(63) Continuation of application No. 14/279,807, filed on May 16, 2014, which is a continuation of application No. 13/798,901, filed on Mar. 13, 2013, now Pat. No. 8,784,770, which is a continuation of application No. 12/896,025, filed on Oct. 1, 2010, now Pat. No. 8,426,066, which is a continuation of application No. 11/831,530, filed on Jul. 31, 2007, now abandoned, which is a continuation-in-part of application No. 11/104,734, filed on Apr. 13, 2005, now Pat. No. 7,648,693.

(51) Int. Cl.
| | |
|---|---|
| *H01M 4/00* | (2006.01) |
| *H01M 4/131* | (2010.01) |
| *H01M 4/505* | (2010.01) |
| *H01M 4/525* | (2010.01) |
| *C01G 45/12* | (2006.01) |
| *C01G 51/00* | (2006.01) |
| *C01G 53/00* | (2006.01) |
| *H01M 4/485* | (2010.01) |
| *H01M 10/052* | (2010.01) |
| *H01M 4/02* | (2006.01) |

(52) U.S. Cl.
CPC ........ *H01M 4/131* (2013.01); *C01G 45/1228* (2013.01); *C01G 51/50* (2013.01); *C01G 53/50* (2013.01); *H01M 4/485* (2013.01); *H01M 4/505* (2013.01); *H01M 4/525* (2013.01); *C01P 2002/54* (2013.01); *C01P 2002/72* (2013.01); *C01P 2002/77* (2013.01); *C01P 2002/88* (2013.01); *C01P 2004/03* (2013.01); *C01P 2004/84* (2013.01); *C01P 2006/10* (2013.01); *C01P 2006/37* (2013.01); *C01P 2006/40* (2013.01); *C01P 2006/80* (2013.01); *H01M 10/052* (2013.01); *H01M 2004/028* (2013.01); *Y02E 60/122* (2013.01); *Y02P 70/54* (2015.11)

(58) Field of Classification Search
CPC ...... H01M 4/131; H01M 4/525; H01M 4/505; H01M 4/485; C01G 45/1228; C01G 53/50; C01G 51/50
USPC ................... 429/223; 252/519.15; 423/594.4
See application file for complete search history.

(56) References Cited

U.S. PATENT DOCUMENTS

| | | | |
|---|---|---|---|
| 4,980,080 A | 12/1990 | Lecerf et al. | |
| 5,264,201 A | 11/1993 | Dahn et al. | |
| 5,370,948 A | 12/1994 | Hasegawa et al. | |
| 5,393,622 A | 2/1995 | Nitta et al. | |
| 5,718,989 A | 2/1998 | Aoki et al. | |
| 5,795,558 A | 8/1998 | Aoki et al. | |
| 6,040,090 A | 3/2000 | Sunagawa et al. | |

(Continued)

FOREIGN PATENT DOCUMENTS

| | | |
|---|---|---|
| CN | 1322026 A | 11/2001 |
| CN | 1356737 A | 7/2002 |

(Continued)

OTHER PUBLICATIONS

Office Action from Chinese Application No. 200780002227.8, dated Sep. 17, 2015.

(Continued)

*Primary Examiner* — Steven Bos
(74) *Attorney, Agent, or Firm* — Lerner, David, Littenberg, Krumholz & Mentlik, LLP

(57) ABSTRACT

Provided is a lithium mixed transition metal oxide having a composition represented by Formula I of $Li_xM_yO_2$ (M, x and y are as defined in the specification) having mixed transition metal oxide layers ("MO layers") comprising Ni ions and lithium ions, wherein lithium ions intercalate into and deintercalate from the MO layers and a portion of MO layer-derived Ni ions are inserted into intercalation/deintercalation layers of lithium ions ("reversible lithium layers") thereby resulting in the interconnection between the MO layers. The lithium mixed transition metal oxide of the present invention has a stable layered structure and therefore exhibits improved stability of the crystal structure upon charge/discharge. In addition, a battery comprising such a cathode active material can exhibit a high capacity and a high cycle stability. Further, such a lithium mixed transition metal oxide is substantially free of water-soluble bases, and thereby can provide excellent storage stability, decreased gas evolution and consequently superior high-temperature stability with the feasibility of low-cost mass production.

21 Claims, 10 Drawing Sheets

(56) References Cited

U.S. PATENT DOCUMENTS

| | | | |
|---|---|---|---|
| 6,393,622 B1 | 5/2002 | Rice | |
| 6,660,432 B2 | 12/2003 | Paulsen et al. | |
| 6,835,492 B2 | 12/2004 | Cho et al. | |
| 6,846,592 B2 | 1/2005 | Kweon et al. | |
| 6,875,416 B1 | 4/2005 | Benz et al. | |
| 6,893,776 B2 | 5/2005 | Naruoka et al. | |
| 6,949,233 B2 | 9/2005 | Kweon et al. | |
| 7,364,793 B2* | 4/2008 | Paulsen | C01G 45/1228 252/182.1 |
| 7,381,498 B2 | 6/2008 | Suhara et al. | |
| 7,648,693 B2* | 1/2010 | Paulsen | C01G 53/006 423/594.15 |
| 7,935,443 B2 | 5/2011 | Ohzuku et al. | |
| 7,939,049 B2* | 5/2011 | Paulsen | C01G 53/006 423/594.15 |
| 7,939,203 B2* | 5/2011 | Paulsen | C01G 53/006 423/594.15 |
| 8,426,066 B2* | 4/2013 | Park | H01M 4/505 429/223 |
| 8,450,013 B2* | 5/2013 | Park | C01G 53/006 429/223 |
| 8,795,897 B2* | 8/2014 | Park | 423/594.15 |
| 2002/0031703 A1 | 3/2002 | Kameyama et al. | |
| 2002/0086210 A1 | 7/2002 | Naruoka et al. | |
| 2003/0022063 A1 | 1/2003 | Paulsen et al. | |
| 2003/0028519 A1 | 2/2003 | Burgess | |
| 2003/0148182 A1 | 8/2003 | Park et al. | |
| 2004/0091779 A1 | 5/2004 | Kang et al. | |
| 2004/0161668 A1 | 8/2004 | Maeda et al. | |
| 2005/0002855 A1 | 1/2005 | Fetcenko et al. | |
| 2005/0058588 A1 | 3/2005 | Kang et al. | |
| 2005/0089756 A1 | 4/2005 | Ito et al. | |
| 2006/0121350 A1* | 6/2006 | Kajiya | C01B 13/185 429/223 |
| 2006/0233696 A1 | 10/2006 | Paulsen et al. | |
| 2009/0224201 A1 | 9/2009 | Paulsen et al. | |

FOREIGN PATENT DOCUMENTS

| | | |
|---|---|---|
| CN | 1417876 A | 5/2003 |
| CN | 1595680 A | 3/2005 |
| CN | 1735986 A | 2/2006 |
| EP | 1143549 A2 | 10/2001 |
| EP | 1317008 | 6/2003 |
| EP | 2016636 A1 | 1/2009 |
| EP | 2016637 A1 | 1/2009 |
| EP | 2016638 A1 | 1/2009 |
| JP | 3281829 | 12/1991 |
| JP | 3244314 | 10/1992 |
| JP | 05062678 A | 3/1993 |
| JP | 8213015 | 8/1996 |
| JP | 10188982 | 7/1998 |
| JP | 10199525 | 7/1998 |
| JP | H11135118 A | 5/1999 |
| JP | 11-283621 | 10/1999 |
| JP | 11307094 | 11/1999 |
| JP | 2000133262 A | 5/2000 |
| JP | 2000353525 | 12/2000 |
| JP | 2001106534 A | 4/2001 |
| JP | 2001-273898 A | 10/2001 |
| JP | 2002110167 A | 4/2002 |
| JP | 2002145623 | 5/2002 |
| JP | 2002358953 | 12/2002 |
| JP | 2002373658 | 12/2002 |
| JP | 2003-017054 | 1/2003 |
| JP | 2003002660 A | 1/2003 |
| JP | 2003034538 | 2/2003 |
| JP | 2003081639 | 3/2003 |
| JP | 2003089526 | 3/2003 |
| JP | 2003297354 | 10/2003 |
| JP | 2004006277 A | 1/2004 |
| JP | 2004031091 | 1/2004 |
| JP | 2004055539 | 2/2004 |
| JP | 2004071518 | 3/2004 |
| JP | 2004111076 | 4/2004 |
| JP | 2004227915 A | 8/2004 |
| JP | 2004-265806 | 9/2004 |
| JP | 2004281253 | 10/2004 |
| JP | 2005025975 | 1/2005 |
| JP | 2005100947 A | 4/2005 |
| JP | 2005150057 | 6/2005 |
| JP | 2005197004 A | 7/2005 |
| JP | 2005310744 | 11/2005 |
| JP | 2005-340186 A | 12/2005 |
| JP | 2006073253 A | 3/2006 |
| JP | 2006107845 | 4/2006 |
| JP | 2008270201 A | 11/2008 |
| JP | 2009536436 A | 10/2009 |
| JP | 2009536437 A | 10/2009 |
| KR | 19980079270 A | 11/1998 |
| KR | 20020036283 A | 5/2002 |
| KR | 20050096191 A | 10/2005 |
| KR | 20060009797 A | 2/2006 |
| TW | 200501486 | 1/2005 |
| WO | 99/40029 | 8/1999 |
| WO | 00/23380 | 4/2000 |
| WO | 03003487 A1 | 1/2003 |
| WO | 2004064180 A1 | 7/2004 |
| WO | 2005/020354 | 3/2005 |
| WO | 2005112152 A1 | 11/2005 |
| WO | 2006/136050 A1 | 12/2006 |
| WO | 2007072759 A1 | 6/2007 |
| WO | 2007129848 A1 | 11/2007 |

OTHER PUBLICATIONS

Omanda, et al.; "Improvement of the Thermal Stability of LiNiO.8CoO.2O2 Cathode by a SiOx Protective Coating"; Journal of the Electrochemical Society; vol. 151, No. 6; pp. A922-A929; 2004.
U.S. Appl. No. 11/831,516.
U.S. Appl. No. 11/831,522.
U.S. Appl. No. 11/831,530.
U.S. Appl. No. 12/378,899.
U.S. Appl. No. 12/378,883.
U.S. Appl. No. 12/378,946.
Office Action from corresponding Chinese Application No. 200780002216 issued Nov. 6, 2009.
Hu Chen, Study on Synthesis and Property of Lithium Nickel Oxides as Cathode Material for Li-ion Batteries, Chinese Doctoral Dissertations & Master's Theses Full-Text Database, vol. 3, 2004.
Office Action from corresponding Chinese Application No. 200780002247.5 issued Jul. 31, 2009.
Office Action from corresponding Chinese Application No. 200780002247.5 issued Jul. 29, 2010.
Yao Chen et al, Journal of Power Sources, 119-121, 184-188, Dec. 31, 2003.
Office Action from corresponding Chinese Application No. 200780002227.8 issued Oct. 30, 2009.
Office Action from corresponding Taiwanese Application No. 095116589 issued Sep. 12, 2009.
Notice of Rejection from corresponding Taiwanese Application No. 095116589 issued Aug. 3, 2010.
International Search Report, PCT/KR2007/002230, dated Aug. 16, 2007.
J. Katana Ngala. Natasha A. Chernova. Luis Matienzo. Peter Y. Zavalij. and M. Stanley Whittingham: liThe Syntheses and Characterization of Layered LiNi1-y-zMnyCozO2 Compounds Mat. Res. Soc. Symp. Proc ., vol. 756.2003. pp. EE6.4.1-EE6.4.6. XP002560562.
J. Katana Ngala. Natasha A. Chernova.Miaomiao MA. Marc Mamak.Peter Y. Zavalij and M. Stanley Whittingham: "The synthesis. characterization and electrochemical behavior of the layered LiNiO.4MnO.4CoO.2O2 compound" J . Ma t e r . C hem ., vol. 14.2004. pp. 214-220. XP002560563.
Supplementary European Search Report, EP 07746385 dated Dec. 17, 2009.
Tran et al., Journal of the Electrochemical Society, 153 (2) A261-A269, published on Dec. 23, 2005.

(56) References Cited

OTHER PUBLICATIONS

Third Party Obervations according to Art. 115 EPC for European Appliction No. 07746385 (EP 2016636) dated May 11, 2009.
International Search Report, PCT/KR2007/002251, dated Aug. 16, 2007.
Supplementary European Search Report, EP 07746404 dated Dec. 17, 2009.
Third Party Obervations according to Art. 115 EPC for European Appliction No. 07746404 (EP 2016637) dated May 11, 2009.
International Search Report, PCT/KR2007/002267, dated Aug. 16, 2007.
Supplementary European Search Report, EP 07746420 dated Dec. 17, 2009.
Third Party Obervations according to Art. 115 EPC for European Appliction No. 07746420 (EP 2016638) dated May 11, 2009.
U.S. Appl. No. 12/893,176.
U.S. Appl. No. 12/914,142.
U.S. Appl. No. 12/896,025.
Third Party Observation for Application No. EP 07746420.4 dated Apr. 4, 2011.
Third Party Observation for Application No. EP 07746404.8 dated Apr. 20, 2012.
Third Party Observation for Application No. EP 07746404.8 dated Apr. 4, 2011.
European Examination Report for Application No. 07746420.4 dated Sep. 7, 2011.
European Examination Report for Application No. 07746404.8 dated Sep. 12, 2011.
European Examination Report for Application No. 07746385.9 dated Sep. 12, 2011.
Extended European Search Report for Application No. EP12158214.2 dated Mar. 29, 2012.
European Search Report for Application No. EP12158214.2 dated Mar. 21, 2012.
European Search Report for Application No. EP12158212.6 dated Mar. 21, 2012.
Extended European Search Report for Application No. EP07746404 dated Jan. 7, 2010.

* cited by examiner

MATERIAL FOR LITHIUM SECONDARY BATTERY OF HIGH PERFORMANCE

CROSS REFERENCE TO RELATED APPLICATIONS

The present application is a continuation of application Ser. No. 14/279,807, filed May 16, 2014, which is a continuation of application Ser. No. 13/798,901, filed Mar. 13, 2013, now issued as U.S. Pat. No. 8,784,770, which is a continuation of application Ser. No. 12/896,025, filed Oct. 1, 2010, now issued as U.S. Pat. No. 8,426,066, which is a continuation of application Ser. No. 11/831,530, filed Jul. 31, 2007, now abandoned, which is a continuation-in-part of U.S. patent application Ser. No. 11/104,734, filed on Apr. 13, 2005, now issued as U.S. Pat. No. 7,648,693, the disclosures of which are incorporated herein by reference.

FIELD OF THE INVENTION

The present invention relates to a Ni-based lithium mixed transition metal oxide and a cathode active material for a secondary battery comprising the same. More specifically, the Ni-based lithium mixed transition metal oxide according to the present invention has a given composition and exhibits intercalation/deintercalation of lithium ions into/from mixed transition metal oxide layers ("MO layers") and interconnection of MO layers via the insertion of a portion of MO layer-derived Ni ions into intercalation/deintercalation layers (reversible lithium layers) of lithium ions, thereby improving the structural stability of the crystal structure upon charge/discharge to provide an excellent sintering stability. In addition, a battery comprising such a cathode active material can exert a high capacity and a high cycle stability. Further, with substantially no water-soluble bases present, such a lithium mixed transition metal oxide exhibits excellent storage stability and chemical resistance, and decreased gas evolution, thereby resulting in an excellent high-temperature stability and the feasibility of mass production at low cost.

BACKGROUND OF THE INVENTION

Technological development and increased demand for mobile equipment have led to a rapid increase in the demand for secondary batteries as an energy source. Among other things, lithium secondary batteries having a high-energy density and voltage, a long cycle lifespan and a low self-discharge rate are commercially available and widely used.

As cathode active materials for the lithium secondary batteries, lithium-containing cobalt oxide ($LiCoO_2$) is largely used. In addition, consideration has been made to using lithium-containing manganese oxides such as $LiMnO_2$ having a layered crystal structure and $LiMn_2O_4$ having a spinel crystal structure, and lithium-containing nickel oxides ($LiNiO_2$).

Of the aforementioned cathode active materials, $LiCoO_2$ is currently widely used due to superior general properties including excellent cycle characteristics, but suffers from low safety, expensiveness due to finite resources of cobalt as a raw material, and limitations in practical and mass application thereof as a power source for electric vehicles (EVs) and the like.

Lithium manganese oxides, such as $LiMnO_2$ and $LiMn_2O_4$, are abundant resources as raw materials and advantageously employ environmentally-friendly manganese, and therefore have attracted a great deal of attention as a cathode active material capable of substituting $LiCoO_2$. However, these lithium manganese oxides suffer from shortcomings such as low capacity and poor cycle characteristics.

Whereas, lithium/nickel-based oxides including $LiNiO_2$ are inexpensive as compared to the aforementioned cobalt-based oxides and exhibit a high discharge capacity upon charging to 4.3 V. The reversible capacity of doped $LiNiO_2$ approximates about 200 mAh/g which exceeds the capacity of $LiCoO_2$ (about 165 mAh/g). Therefore, despite a slightly lower average discharge voltage and a slightly lower volumetric density, commercial batteries comprising $LiNiO_2$ as the cathode active material exhibit an improved energy density. To this end, a great deal of intensive research is being actively undertaken on the feasibility of applications of such nickel-based cathode active materials for the development of high-capacity batteries. However, the $LiNiO_2$-based cathode active materials suffer from some limitations in practical application thereof, due to the following problems.

First, $LiNiO_2$-based oxides undergo sharp phase transition of the crystal structure with volumetric changes accompanied by repeated charge/discharge cycling, and thereby may suffer from cracking of particles or formation of voids in grain boundaries. Consequently, intercalation/deintercalation of lithium ions may be hindered to increase the polarization resistance, thereby resulting in deterioration of the charge/discharge performance. In order to prevent such problems, conventional prior arts attempted to prepare a $LiNiO_2$-based oxide by adding an excess of a Li source and reacting reaction components under an oxygen atmosphere. However, the thus-prepared cathode active material, under the charged state, undergoes structural swelling and destabilization due to the repulsive force between oxygen atoms, and suffers from problems of severe deterioration in cycle characteristics due to repeated charge/discharge cycles.

Second, $LiNiO_2$ has shortcomings associated with evolution of excess of gas during storage or cycling. That is, in order to smoothly form the crystal structure, an excess of a Li source is added during manufacturing of the $LiNiO_2$-based oxide, followed by heat treatment. As a result, water-soluble bases including $Li_2CO_3$ and LiOH reaction residues remain between primary particles and thereby they decompose or react with electrolytes to thereby produce $CO_2$ gas, upon charging. Further, $LiNiO_2$ particles have an agglomerate secondary particle structure in which primary particles are agglomerated to form secondary particles and consequently a contact area with the electrolyte further increases to result in severe evolution of $CO_2$ gas, which in turn unfortunately leads to the occurrence of battery swelling and deterioration of desirable high-temperature safety.

Third, $LiNiO_2$ suffers from a sharp decrease in the chemical resistance of a surface thereof upon exposure to air and moisture, and gelation of slurries by polymerization of an N-methyl pyrrolidone/poly(vinylidene fluoride) (NMP-PVDF) slurry due to a high pH value. These properties of $LiNiO_2$ cause severe processing problems during battery production.

Fourth, high-quality $LiNiO_2$ cannot be produced by a simple solid-state reaction as is used in the production of $LiCoO_2$, and $LiNiMeO_2$ (Me=Co, Mn or Al) cathode active materials containing an essential dopant cobalt and further dopants manganese and aluminum are produced by reacting a lithium source such as $LiOH.H_2O$ with a mixed transition metal hydroxide under an oxygen or syngas atmosphere (i.e., a $CO_2$-deficient atmosphere), which consequently increases production costs. Further, when an additional step, such as intermediary washing or coating, is included to remove impurities in the production of LiNiO$_2$, this leads to a further increase in production costs.

Further, Japanese Unexamined Patent Publication Nos. 2004-281253, 2005-150057 and 2005-310744 disclose oxides having a composition formula of Li$_a$Mn$_x$Ni$_y$M$_z$O$_2$ (M=Co or Al, 1≤a≤1.2, 0≤x≤0.65, 0.35≤y≤1, 0≤z≤0.65, and x+y+z=1). However, it was found through various experiments conducted by the inventors of the present invention that the aforementioned oxides include large amounts of impurities such as lithium carbonates, and suffer from significant problems associated with severe gas evolution at high temperatures and structural instability.

Therefore, there is an urgent need in the art for the development of a technology which is capable of achieving a structurally stable crystal structure while utilizing a lithium/nickel-based cathode active material which can allow for high charge capacity and is capable of securing high-temperature safety.

SUMMARY OF THE INVENTION

Therefore, the present invention has been made to solve the above problems and other technical problems that have yet to be resolved.

As a result of a variety of extensive and intensive studies and experiments and in view of the problems as described above, the inventors of the present invention provide herewith a lithium mixed transition metal oxide, as will be illustrated hereinafter, having a given composition and a specific atomic-level structure, with which it is possible to realize superior thermal stability, and high cycle stability in conjunction with a high capacity, due to improvements in the stability of the crystal structure upon charge/discharge. Further, such a lithium mixed transition metal oxide can be prepared in a substantially water-soluble base-free form and therefore exhibits excellent storage stability, reduced gas evolution and thereby excellent high-temperature safety in conjunction with the feasibility of industrial-scale production at low production costs. The present invention has been completed based on these findings.

BRIEF DESCRIPTION OF THE DRAWINGS

The above and other features and advantages of the present invention will be more clearly understood from the following detailed description taken in conjunction with the accompanying drawings, in which.

DETAILED DESCRIPTION OF PREFERRED EMBODIMENTS

In accordance with an aspect of the present invention, the above can be accomplished by the provision of a lithium mixed transition metal oxide having a composition represented by Formula I below, wherein lithium ions undergo intercalation/deintercalation into/from intercalation/deintercalation layers which are disposed alternately and repeatedly with mixed transition metal oxide layers ("MO layers") containing Ni ions, and a portion of MO layer-derived Ni ions are inserted into the intercalation/deintercalation layers of lithium ions (also referred to herein as "reversible lithium layers") thereby resulting in the interconnection of and between the MO layers and reversible lithium layers.

wherein:

M=M'$_{1-k}$A$_k$, wherein M' is Ni$_{1-a-b}$(Ni$_{1/2}$Mn$_{1/2}$)$_a$Co$_b$, 0.65≤a+b≤0.85 and 0.1≤b≤0.4;

A is a dopant;

0≤k<0.05; and x+y≈2 and 0.95≤x≤1.05.

Figure 1:
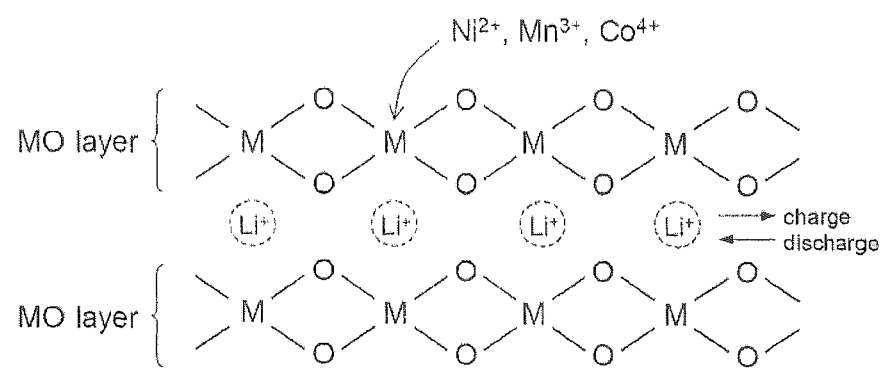
FIG. 1 is a schematic view showing a crystal structure of a conventional Ni-based lithium transition metal oxide.

A conventional lithium transition metal oxide has a layered crystal structure as shown in FIG. 1, and performs charge/discharge processes through lithium insertion and desertion into/from the reversible lithium layers. However, when the oxide having such a structure is used as a cathode active material, deintercalation of lithium ions from the reversible lithium layers in the charged state brings about swelling and destabilization of the crystal structure due to the repulsive force between oxygen atoms in the MO layers, and thus lithium transition metal oxide suffers from problems associated with sharp decreases in the capacity and cycle characteristics, resulting from the structural changes in the crystal structure due to repeated charge/discharge cycles.

Figure 2:
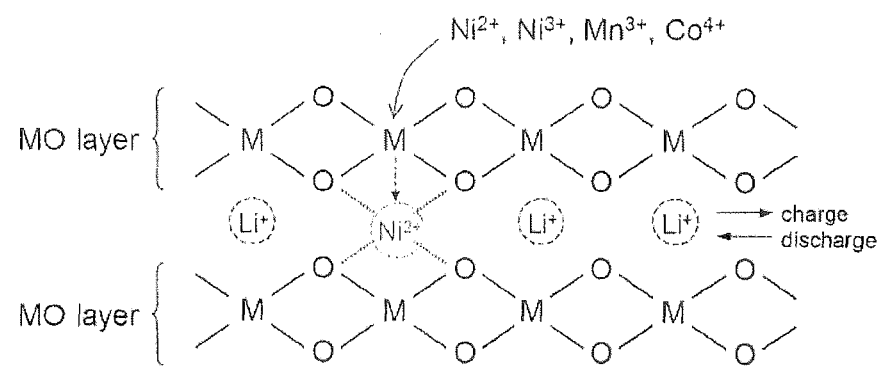
FIG. 2 is a schematic view showing a crystal structure of a Ni-based lithium mixed transition metal oxide according to an embodiment.

As a result of a variety of extensive and intensive studies and experiments to solve the problems as described above, the inventors of the present invention have surprisingly found that the crystal structure in the lithium mixed transition metal oxides disclosed herein stabilizes contrary to conventionally known or accepted ideas in the related art that intercalation/deintercalation of lithium ions will be hindered when a portion of the nickel ions present transfer to and are immobilized in the reversible lithium layers as shown in FIG. 2, so it is possible to prevent problems associated with collapse of the crystal structure caused by the intercalation/deintercalation of lithium ions. As a result, since the lifespan characteristics and safety of the lithium mixed transition metal oxide are simultaneously improved due to a lack of occurrence of additional structural collapse by oxygen desorption and prevention of further formation of $Ni^{2+}$ ions, the battery capacity and cycle characteristics can be significantly improved and a desired level of rate characteristics can be exerted. Therefore, it can be said that such a concept of the present invention is a remarkable one which is completely opposite to and overthrows the conventional ideas of structural stability in such systems.

That is, due to the insertion of a portion of Ni ions into the reversible lithium layers, the lithium mixed transition metal oxide in accordance with the present invention does not undergo disintegration of the crystal structure with maintenance of the oxidation number of Ni ions inserted into the reversible lithium layers, even when lithium ions are released during a charge process, thereby being capable of maintaining a well-layered structure. Hence, a battery comprising the lithium mixed transition metal oxide having such a structure as a cathode active material can exert a high capacity and a high-cycle stability.

Further, the lithium mixed transition metal oxide in accordance with the present invention has excellent thermal stability as the crystal structure is stably maintained even upon sintering at a relatively high temperature during a production process.

Generally, when conventional high-nickel $LiMO_2$ is subjected to high-temperature sintering in air containing a trace amount of $CO_2$, $LiMO_2$ decomposes with a decrease of $Ni^{3+}$ ions as shown in the following reaction below, and during which amounts of impurities $Li_2CO_3$ increase.

Further, continuous degradation of the crystal structure occurs with increased cation mixing, an increased lattice constant and a decreased c:a ratio, molten $Li_2CO_3$ impurities segregate particles of the $LiMO_2$, and primary particles lose a contact state therebetween, thereby resulting in the disintegration of secondary particles.

However, unlike the conventional high-nickel $LiMO_2$, the lithium mixed transition metal oxide in accordance with the present invention, due to the stability of the atomic-level structure, does not include $Li_2CO_3$ impurities resulting from oxygen deficiency due to a decrease in and decomposition of $Ni^{3+}$ ions as shown in the above reaction, and therefore exhibits no degradation of the crystal structure, even when subjected to high-temperature sintering under an air atmosphere. Further, there are substantially no water-soluble bases present, as the lithium mixed transition metal oxide of the present invention can be prepared without addition of an excess of a lithium source. Accordingly, the lithium mixed transition metal oxide of the present invention exhibits excellent storage stability, decreased gas evolution and thereby excellent high-temperature stability simultaneously with the feasibility of industrial-scale production at low production costs.

In contrast to the desirable properties of the lithium mixed transition metal oxide of the present invention, the inventors hereof have found that the above-referenced oxides disclosed in Japanese Unexamined Patent Publication Nos. 2004-281253, 2005-150057 and 2005-310744, and which have a similar composition, nonetheless do not have the same structure as that of the lithium mixed transition metal oxides of the present invention, include large amounts of impurities such as lithium carbonates, and suffer from severe gas evolution at high temperatures and structural instability.

Hereinafter, where appropriate throughout the specification, the term "lithium mixed transition metal oxide in accordance with the present invention" is used interchangeably with the term "$LiNiMO_2$", and the term "Ni ions inserted and bound into the reversible lithium layers" is used interchangeably with the term "inserted Ni". Therefore, NiM in $LiNiMO_2$ is a suggestive expression representing a complex composition of Ni, Mn and Co in Formula I.

In one specific embodiment, the lithium mixed transition metal oxide have a structure wherein $Ni^{2+}$ and $Ni^{3+}$ ions coexist in the MO layers and a portion of $Ni^{2+}$ ions are inserted into the reversible lithium layers. That is, in such a structure of the metal oxide, all of Ni ions inserted into the reversible lithium layers are $Ni^{2+}$ ions and the oxidation number of Ni ions is not changed in the charge process.

Specifically, when $Ni^{2+}$ and $Ni^{3+}$ ions coexist in a Ni-excess lithium transition metal oxide, an oxygen atom-deficient state is present under given conditions (reaction atmosphere, Li content, and the like) and therefore insertion of a portion of the $Ni^{2+}$ ions into the reversible lithium layers may occur with changes in the oxidation number of Ni.

The composition of the lithium mixed transition metal oxide should satisfy the following specific requirements as defined in Formula I:

(i) $Ni_{1-(a+b)}(Ni_{1/2}Mn_{1/2})_aCo_b$ and $0.65 \le a+b \le 0.85$ (ii) $0.1 \le b \le 0.4$, and (iii) $x+y \approx 2$ and $0.95 \le x \le 1.05$ Regarding the aforementioned requirement (i), $Ni_{1-(a+b)}$ means a content of ions of $Ni^{3+}$. Therefore, if a mole fraction of $Ni^{3+}$ exceeds 0.35 (a+b<0.65), it is impossible to implement an industrial-scale production in air, using $Li_2CO_3$ as a precursor material, so the lithium transition metal oxide should be produced using LiOH as a precursor material under an oxygen atmosphere, thereby presenting a problems associated with decreased production efficiency and consequently increased production costs. On the other hand, if a mole fraction of $Ni^{3+}$ is lower than 0.15 (a+b>0.85), the capacity per volume of $LiNiMO_2$ is not competitive as compared to $LiCoO_2$.

Meanwhile, taking into consideration both of the above requirements (i) and (ii), the total mole fraction of Ni ions including $Ni^{2+}$ ions and $Ni^{3+}$ ions in $LiNiMO_2$ of the present invention is preferably of a relative nickel-excess compared to manganese and cobalt and may be 0.4 to 0.7. If a content of nickel is excessively low, it is difficult to achieve a high capacity. Conversely, if a content of nickel is excessively high, the safety may be significantly lowered. In conclusion, the lithium transition metal oxide ($LiNiMO_2$) exhibits a large volume capacity and low raw material costs, as compared to lithium cobalt-based oxides.

Figure 3:
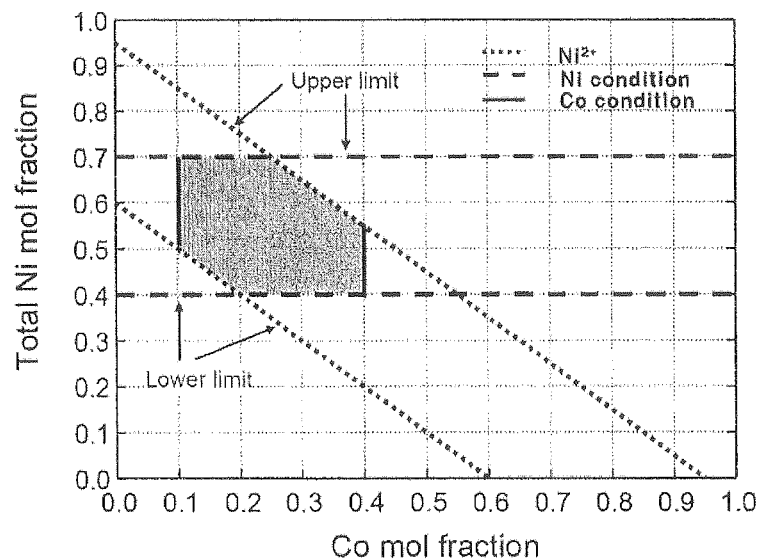
FIGS. 3 and 4 are graphs showing a preferred composition range of a Ni-based lithium mixed transition metal oxide according to an embodiment.
Figure 4:
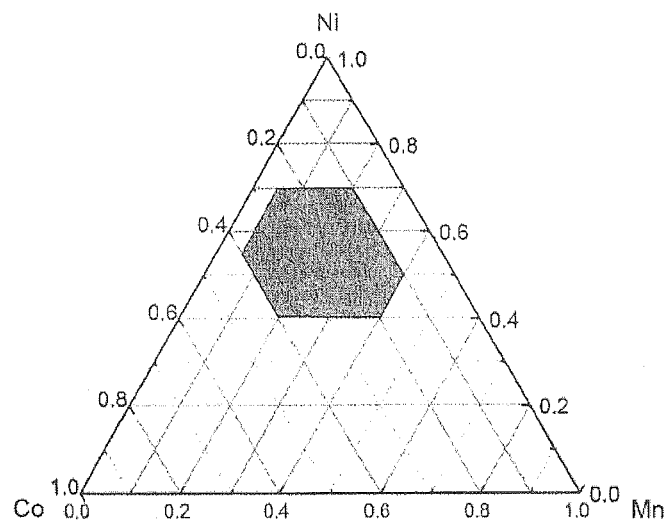

Further, if the mole fraction of $Ni^{2+}$ ions is too high relative to the Ni content, the cation mixing increases, resulting in formation of a "rock salt" like crystalline structure that is excessively stable to the point of being locally and electrochemically non-reactive, and such a rock salt structure not only hinders charge/discharge and but also may bring about a decrease in a discharge capacity. On the other hand, if the mole fraction of $Ni^{2+}$ ions is too low, this may lead to an increase in the structural instability to thereby lower the cycle stability. Therefore, the mole fraction of $Ni^{2+}$ ions should be appropriately adjusted taking into consideration such problems that may occur. Preferably, within the range as shown in FIG. 3, the mole fraction of $Ni^{2+}$ ions may be 0.05 to 04, based on the total content of Ni.

Therefore, since $Ni^{2+}$ is inserted into the reversible lithium layers and serves to support the MO layers, $Ni^{2+}$ is contained in an amount sufficient to provide a stable structural support between MO layers such that the charge stability and cycle stability can be improved to a desired level, and at the same time it is inserted in an amount not so as to hinder intercalation/deintercalation of lithium ions into/from the reversible lithium layers such that rate characteristics are not deteriorated. Taken altogether, the mole fraction of $Ni^{2+}$ ions inserted and bound into the reversible lithium layers may be specifically 0.03 to 0.07, based on the total molar content of Ni.

The content of $Ni^{2+}$ ions or the content of inserted $Ni^{2+}$ ions may be determined by controlling, for example, a sintering atmosphere, the content of lithium, and the like. For example, when a concentration of oxygen in the sintering atmosphere is high, the content of $Ni^{2+}$ will be relatively low.

With regard to the aforementioned condition (ii), a content of cobalt (b) is 0.1 to 0.4. If the content of cobalt is excessively high (b>0.4), the overall cost of a raw material increases due to a high content of cobalt, and the reversible capacity decreases. On the other hand, if the content of cobalt is excessively low (b<0.1), it is difficult to achieve sufficient rate characteristics and a high powder density of the battery at the same time.

With regard to the aforementioned condition (iii), if a content of lithium is excessively high, i.e. x>1.05, this may result in a problem of decreased stability during charge/discharge cycling, particularly at T=60° C. and a high voltage (U=4.35 V). On the other hand, if a content of lithium is excessively low, i.e. x<0.95, this may result in poor rate characteristics and a decreased reversible capacity.

In an embodiment, $LiNiMO_2$ may further comprise trace amounts of dopants. Examples of the dopants may include aluminum, titanium, magnesium and the like, which are incorporated into the crystal structure. Further, other dopants, such as B, Ca, Zr, F, P, Bi, Al, Mg, Zn, Sr, Ga, In, Ge, and Sn, may be included via the grain boundary accumulation or surface coating of the dopants without being incorporated into the crystal structure. These dopants are included in amounts enough to increase the safety, capacity and overcharge stability of the battery while not causing a significant decrease in the reversible capacity. Therefore, a content of the dopant is less than 5% (k<0.05), as defined in Formula I. In addition, the dopants may be preferably added in an amount of <1%, within a range that can improve the stability without causing deterioration of the reversible capacity.

As a molar ratio (Li/M) of Li to the transition metal (M) decreases, the amount of Ni ions present in the MO layers gradually increases. Therefore, if excessive amounts of Ni ions transfer into the reversible lithium layers, a movement of $Li^+$ during charge/discharge processes is hampered to thereby lead to problems associated with a decrease in the reversible capacity or deterioration of the rate characteristics. On the other hand, the Li/M ratio is excessively high, the amount of Ni present in the MO layer is excessively low, which may undesirably lead to structural instability, thereby presenting decreased safety of the battery and poor lifespan characteristics. Further, at an excessively high Li/M value, amounts of unreacted $Li_2CO_3$ increase to thereby result in a high pH-titration value, i.e., production of large amounts of impurities, and consequently the chemical resistance and high-temperature stability may deteriorate. Therefore, in one preferred embodiment, the ratio of Li:M in $LiNiMO_2$ may be 0.95 to 1.04:1.

In one embodiment, the lithium mixed transition metal oxide in accordance with the present invention is substantially free of water-soluble base impurities, particularly $Li_2CO_3$.

Usually, Ni-based lithium transition metal oxides contain large amounts of water-soluble bases such as lithium oxides, lithium sulfates, lithium carbonates, and the like. These water-soluble bases may be bases, such as $Li_2CO_3$ and LiOH, present in $LiNiMO_2$, or otherwise may be bases produced by ion exchange ($H^+$ (water)← →$Li^+$ (surface, an outer surface of the bulk)), performed at the surface of $LiNiMO_2$. The bases of the latter case are usually present at a negligible level.

The former water-soluble bases are formed primarily due to unreacted lithium raw materials upon sintering. This is because as a conventional Ni-based lithium transition metal oxide employs relatively large amounts of lithium and low-temperature sintering so as to prevent the collapse of a layered crystal structure, the resulting metal oxide has relatively large amounts of grain boundaries as compared to the cobalt-based oxides and lithium ions do not sufficiently react upon sintering.

On the other hand, since $LiNiMO_2$ in accordance with the present invention, as discussed hereinbefore, maintains a structurally stable layered crystal structure, it is possible to carry out a sintering process at a relatively high-temperature under an air atmosphere and thereby $LiNiMO_2$ has relatively small amounts of grain boundaries. In addition, as retention of unreacted lithium species on the surfaces of particles is prevented, the particle surfaces are substantially free of lithium salts such as lithium carbonates, lithium sulfates, and the like. Further, there is no need to add an excess of a lithium source upon production of $LiNiMO_2$, so it is possible to fundamentally prevent a problem associated with the formation of impurities due to the unreacted lithium source remaining in the powder.

As such, it is possible to fundamentally solve various problems that may occur due to the presence of the water-soluble bases, particularly the problem that may damage the battery safety due to evolution of gas arising from acceleration of electrolyte decomposition at high temperatures.

As used herein, the phrase "is (are) substantially free of water-soluble bases" refers to an extent that upon titration of 200 mL of a solution containing the lithium mixed transition metal oxide with 0.1M HCl, the amount of HCl solution used to reach a pH of less than 5 is less than 20 mL, more preferably less than 10 mL, which corresponds to a content of $Li_2CO_3$ impurity of about 0.2% by weight or less. Herein, 200 mL of the aforementioned solution contains substantially all of the water-soluble bases in the lithium mixed transition metal oxide, and is prepared by repeatedly soaking and decanting 10 g of the lithium mixed transition metal oxide.

More specifically, first, 5 g of a cathode active material powder is added to 25 mL of water, followed by brief stirring. About 20 mL of a clear solution is separated and pooled from the powder by soaking and decanting. Again, about 20 mL of water is added to the powder and the resulting mixture is stirred, followed by decanting and pooling. The soaking and decanting are repeated at least 5 times. In this manner, total 100 mL of the clear solution containing water-soluble bases is pooled. A 0.1M HCl solution is added to titrate the thus-pooled solution, where pH titration is done with stirring. The pH profile is recorded as a function of time. Experiments are terminated when the pH reaches a value of less than about 3, and a flow rate may be selected within a range that titration takes about 20 to about 30 min. The content of the water-soluble bases is given as an amount of acid that was used until the pH reaches a value of less than about 5.

In this manner, it is possible to determine the content of the water-soluble bases contained in the aforesaid powder. At this time, there are no significant influences of parameters such as a total soaking time of the powder in water.

A method of preparing the lithium mixed transition metal oxide in accordance with the present invention may be preferably carried out under an oxygen-deficient atmosphere. The oxygen-deficient atmosphere may be an atmosphere with an oxygen concentration of preferably 10% to 50% by volume, more preferably 10% to 30% by volume. In an embodiment, the lithium mixed transition metal oxide can be prepared by a solid-state reaction of $Li_2CO_3$ and mixed transition metal precursors in the air atmosphere. Therefore, it is also possible to solve various problems associated with increased production costs and the presence of large amounts of water-soluble bases, which the conventional arts suffer from when making the lithium transition metal oxide involving adding, mixing and sintering of LiOH and each transition metal precursor under an oxygen atmosphere. That is, the present invention enables production of the lithium mixed transition metal oxide having a given composition and a high content of nickel via a simple solid-state reaction in air, using a raw material that is cheap and easy to handle. Therefore, it is possible to realize a significant reduction of production costs and high-efficiency mass production.

That is, due to thermodynamic limitations in the conventional art, it was impossible to produce high-nickel lithium mixed transition metal oxide in the air containing trace amounts of carbon dioxide. In addition, the conventional art suffered from problems in that utilization of $Li_2CO_3$ as a precursor material brings about evolution of $CO_2$ due to decomposition of $Li_2CO_3$, which then thermodynamically hinders additional decomposition of $Li_2CO_3$ even at a low partial pressure, consequently resulting in no further progression of the reaction. For these reasons, it was impossible to use $Li_2CO_3$ as the precursor in the practical production process.

On the other hand, the lithium mixed transition metal oxide in accordance with the present invention employs $Li_2CO_3$ and the mixed transition metal precursor as the reaction materials, and can be prepared by reacting reactants in an oxygen-deficient atmosphere, preferably in air. As a result, it is possible to achieve a significant reduction of production costs, and a significant increase of the production efficiency due to the feasibility to produce a desired product by a relatively simple process. This is because the lithium mixed transition metal oxide in accordance with the present invention is very excellent in the sintering stability at high temperatures, i.e. the thermodynamic stability, due to a stable crystal structure.

Further, since the lithium source material and the mixed transition metal material may be preferably added in a ratio of 0.95 to 1.04:1 when producing the lithium mixed transition metal oxide in accordance with the present invention, there is no need to add an excess of a lithium source and it is possible to significantly reduce the possibility of retention of the water-soluble bases which may derive from the residual lithium source.

In order to carry out a smooth reaction via high air circulation upon production of the lithium mixed transition metal oxide by the large-scale mass production process, preferably at least 2 $m^3$ (a volume at room temperature) of air, per kg of the final lithium mixed transition metal oxide, may be pumped into or out of a reaction vessel. For this purpose, a heat exchanger may be employed to further enhance the efficiency of energy utilization by pre-warming the in-flowing air before it enters the reactor, while cooling the out-flowing air.

In accordance with a further aspect of the present invention, there is provided a cathode active material for a secondary battery comprising the aforementioned lithium nickel-based oxide.

The cathode active material in accordance with the present invention may be comprised only of the lithium mixed transition metal oxide having the above-specified composition and the specific atomic-level structure, or where appropriate, it may be comprised of the lithium mixed transition metal oxide in conjunction with other lithium-containing transition metal oxides.

Examples of the lithium-containing transition metal oxides that can be used in the present invention may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+y}Mn_{2-y}O_4$ ($0 \leq y \leq 0.33$), $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; Ni-site type lithium nickel oxides of Formula $LiNi_{1-y}M_yO_2$ (M=Co, Mn, Al, Cu, Fe, Mg, B, or Ga, and $0.01 \leq y \leq 0.3$); lithium manganese composite oxides of Formula $LiMn_{2-y}M_yO_2$ (M=Co, Ni, Fe, Cr, Zn, or Ta, and $0.01 \leq y \leq 0.1$), or Formula $Li_2Mn_3MO_8$ (M=Fe, Co, Ni, Cu, or Zn); $LiMn_2O_4$ wherein a portion of Li is substituted with alkaline earth metal ions; disulfide compounds; and $Fe_2(MoO_4)_3$, $LiFe_3O_4$, and the like.

In accordance with a still further aspect of the present invention, there is provided a lithium secondary battery comprising the aforementioned cathode active material. The lithium secondary battery is generally comprised of a cathode, an anode, a separator and a lithium salt-containing non-aqueous electrolyte. Methods for preparing the lithium secondary battery are known and therefore detailed description thereof will be omitted herein.

The cathode is, for example, fabricated by applying a mixture of the above-mentioned cathode active material, a conductive material and a binder to a cathode current collector, followed by drying. If necessary, a filler may be further added to the above mixture.

The cathode current collector is generally fabricated to have a thickness of 3 to 500 μm. There is no particular limit to materials for the cathode current collector, so long as they have high conductivity without causing chemical changes in the fabricated battery. As examples of the materials for the cathode current collector, mention may be made of stainless steel, aluminum, nickel, titanium, sintered carbon, and aluminum or stainless steel which was surface-treated with carbon, nickel, titanium or silver. The current collector may be fabricated to have fine irregularities on the surface thereof so as to enhance adhesion to the cathode active material. In addition, the current collector may take various forms including films, sheets, foils, nets, porous structures, foams and non-woven fabrics.

The conductive material is typically added in an amount of 1 to 50% by weight, based on the total weight of the mixture including the cathode active material. There is no particular limit to the conductive material, so long as it has suitable conductivity without causing chemical changes in the fabricated battery. As examples of conductive materials, mention may be made of conductive materials, including graphite such as natural or artificial graphite; carbon black such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component assisting in binding between the electrode active material and the conductive material, and in binding of the electrode active material to the current collector. The binder is typically added in an amount of 1 to 50% by weight, based on the total weight of the mixture including the cathode active material. As examples of the binder, mention may be made of polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber and various copolymers.

The filler is an optional ingredient used to inhibit cathode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fiber and carbon fiber.

The anode is fabricated by applying an anode active material to an anode current collector, followed by drying. If necessary, other components as described above may be further included.

The anode current collector is generally fabricated to have a thickness of 3 to 500 μm. There is no particular limit to materials for the anode current collector, so long as they have suitable conductivity without causing chemical changes in the fabricated battery. As examples of materials for the anode current collector, mention may be made of copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be processed to form fine irregularities on the surfaces thereof so as to enhance adhesion to the anode active material. In addition, the anode current collector may be used in various forms including films, sheets, foils, nets, porous structures, foams and non-woven fabrics.

As examples of the anode active materials utilizable in the present invention, mention may be made of carbon such as non-graphitizing carbon and graphite-based carbon; metal composite oxides such as $Li_yFe_2O_3$ ($0 \leq y \leq 1$), $Li_yWO_2$ ($0 \leq y \leq 1$) and $Sn_xMe_{1-x}Me'_yO_z$ (Me: Mn, Fe, Pb or Ge; Me': Al, B, P, Si, Group I, Group II and Group III elements of the Periodic Table of the Elements, or halogens; $0 < x \leq 1$; $1 \leq y \leq 3$; and $1 \leq z \leq 8$); lithium metals; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni based materials.

The separator is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing non-aqueous electrolyte is composed of an electrolyte and a lithium salt. As the electrolyte, a non-aqueous organic solvent, an organic solid electrolyte, or an inorganic solid electrolyte may be utilized.

As the non-aqueous organic solvent that can be used in the present invention, for example, mention may be made of aprotic organic solvents such as N-methyl-2-pyrrolidone, propylene carbonate, ethylene carbonate, butylene carbonate, dimethyl carbonate, diethyl carbonate, gamma-butyro lactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte utilized in the present invention, mention may be made of polyethylene derivatives, polyethylene oxide derivatives, polypropylene oxide derivatives, phosphoric acid ester polymers, alginate/poly-l-lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

In accordance with yet another aspect of the present invention, there is provided a lithium mixed transition metal oxide comprising a mixed transition metal of Ni, Mn and Co and comprising mixed-transition metal oxide layers ("MO layers") containing Ni ions, and reversible lithium layers which allow intercalation and deintercalation of lithium ions, wherein the MO layers and the reversible lithium layers are disposed alternately and repeatedly to form a layered crystal structure, and a portion of Ni ions derived from the MO layer are inserted into the reversible lithium layers, thereby resulting in interconnection of the MO layers.

Generally, the use of nickel-based lithium mixed transition metal oxide as the cathode active material may bring about the collapse of the crystal structure upon intercalation/deintercalation of lithium ions. However, the lithium mixed transition metal oxide in accordance with the present invention exhibits stabilization of the crystal structure due to nickel ions inserted into the reversible lithium layers and therefore does not undergo additional structural collapse that may result from oxygen desorption, thereby simultaneously improving the lifespan characteristics and safety.

Further, the present invention provides a lithium mixed transition metal oxide having a composition represented by Formula II below, wherein a molar cation mixing ratio for a portion of Ni located in lithium sites of the lithium mixed transition metal oxide is 0.03 to 0.07 of the total content of Ni, and is sufficient to provide the structurally stable, layered crystal structure.

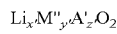 $$Li_{x'}M''_{y'}A'_{z'}O_2 \quad (II)$$

wherein
$0.95 \leq x' \leq 1.05$, $0 \leq z' \leq 0.05$, $x'+y' \approx 2$, and $y'+z'=1$;
M" is a mixed transition metal of Ni, Mn and Co; and
A' is at least one element selected from the group consisting of B, Ca, Zr, S, F, P, Bi, Al, Mg, Zn, Sr, Cu, Fe, Ga, In, Cr, Ge and Sn.

According to the experimental results by the present inventors, the cation mixing ratio is particularly preferably 0.03 to 0.07, upon considering of both the charge and cycle stability, and the rate characteristics. When the cation mixing ratio is within the above-specified range, the crystal structure can be further stably maintained and a hindrance of Li$^+$ migration can be minimized.

Further, the present invention provides a lithium mixed transition metal oxide having a composition of Formula II, wherein a molar ratio of lithium to a mixed transition metal (M) is 0.95:1 to 1.04:1, and a portion of Ni ions are inserted into lithium sites in the reversible lithium layers to interconnect the MO layers and the reversible lithium layers and to provide a structurally stable layered crystal structure.

Therefore, there is no need to add an excess of a lithium source and it is also possible to significantly reduce the possibility of retention of the water-soluble base impurities which may derive from the lithium source.

When the molar ratio of lithium to the mixed transition metal (M) is 0.95:1 to 1.04:1, this may lead to appropriate cation mixing to thereby further enhance the structural stability and minimize a hindrance of Li$^+$ migration during the charge and discharge process. Therefore, the lithium mixed transition metal oxide exhibits excellent stability, lifespan characteristics and rate characteristics. Further, this metal oxide has a high capacity, as well as high chemical resistance and high-temperature stability due to substantially no water-soluble bases.

In one preferred embodiment, the lithium mixed transition metal oxide has a composition of Formula II and a cation mixing ratio for the amount of Ni ions located in lithium sites is 0.03 to 0.07 based on the total content of Ni to thereby stably support the layered crystal structure. Further, the present invention provides a lithium mixed transition metal oxide comprising mixed transition metal oxide layers ("MO layers") comprising Ni, Mn and Co, and reversible lithium layers which allow lithium ion intercalation/deintercalation, wherein the MO layers and the reversible lithium layers are disposed alternately and repeatedly to form a layered crystal structure, the MO layers contain Ni$^{3+}$ ions and Ni$^{2+}$ ions, and a portion of Ni$^{2+}$ ions derived from the MO layers are inserted into the reversible lithium layers.

Such a structure is not known in the art and makes a significant contribution to the stability and lifespan characteristics of the lithium mixed transition metal oxide disclosed herein.

Further, the present invention provides a lithium mixed transition metal oxide having a composition of Formula I and comprising mixed transition metal oxide layers ("MO layers"), wherein the MO layers contain Ni$^{3+}$ ions and Ni$^{2+}$ ions, and a portion of Ni$^{2+}$ ions derived from the MO layers are inserted into the reversible lithium layers, during preparation of the lithium mixed transition metal oxide by a reaction of lithium mixed transition metal oxide precursor materials under an O$_2$-deficient atmosphere.

In comparison therefore, a conventional lithium transition metal oxide has a crystal structure with no insertion of Ni$^{2+}$ ions into the MO layer as effected by the reaction of identical precursor materials under an oxygen atmosphere, whereas the lithium mixed transition metal oxide in accordance with the present invention has a structure wherein relatively large amounts of Ni$^{2+}$ ions are produced by carrying out the reaction under an oxygen-deficient atmosphere and a portion of the thus-produced Ni$^{2+}$ ions are inserted into the reversible lithium layers. Therefore, as illustrated hereinbefore, the crystal structure is stably maintained to thereby exert superior sintering stability, and a secondary battery comprising the same exhibits excellent cycle stability.

EXAMPLES

Now, the present invention will be described in more detail with reference to the following Examples. These examples are provided only for illustrating the present invention and should not be construed as limiting the scope and spirit of the present invention.

Example 1

A mixed hydroxide of Formula MOOH (M=Ni$_{4/15}$(Mn$_{1/2}$Ni$_{1/2}$)$_{8/15}$Co$_{0.2}$) as a mixed transition metal precursor and Li$_2$CO$_3$ were mixed in a stoichiometric ratio (Li:M=1.02:1), and the mixture was sintered in air at various temperatures of 850 (Ex. 1A), 900 (Ex. 1B), 950 (Ex. 1C), and 1,000° C. for 10 hours, to preparing a lithium mixed transition metal oxide. Herein, secondary particles were maintained intact without being collapsed, and the crystal size increased with an increase in the sintering temperature.

X-ray analysis showed that all samples have a well-layered crystal structure. Further, a unit cell volume did not exhibit a significant change with an increase in the sintering temperature, thus representing that there was no significant oxygen-deficiency and no significant increase of cation mixing, in conjunction with essentially no occurrence of lithium evaporation.

Figure 5:
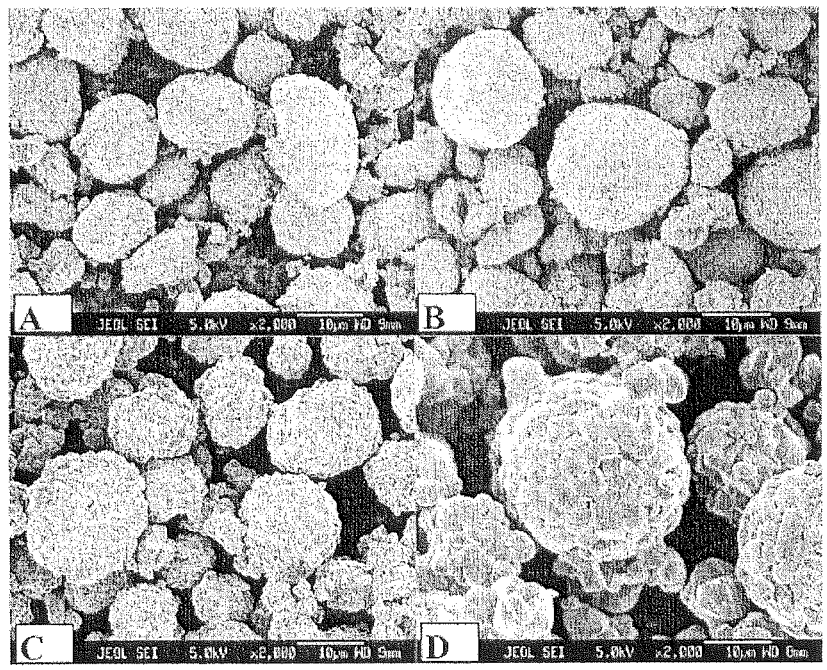
FIG. 5 is an FESEM (Field Emission Scanning Electron Microscope) image (×2,000) showing LiNiMO$_2$ according to Example 1 of the present invention. 5A: 850° C.; 5B: 900° C.; 5C: 950° C.; and 5D: 1000° C.

The crystallographic data for the thus-prepared lithium mixed transition metal oxide are given in Table 1 below, and FESEM images thereof are shown in FIG. 5. From these results, it was found that the lithium mixed transition metal oxide is $LiNiMO_2$ having a well-layered crystal structure with the insertion of nickel at a level of 3.9 to 4.5% into a reversible lithium layer. Further, it was also found that even though $Li_2CO_3$ was used as a raw material and sintering was carried out in air, proper amounts of $Ni^{2+}$ ions were inserted into the lithium layer, thereby achieving the desired structural stability.

Particularly, Sample B, sintered at 900° C., exhibited a high c:a ratio and therefore excellent crystallinity, a low unit cell volume and a reasonable cation mixing ratio. As a result, Sample B showed the most excellent electrochemical properties, and a BET surface area of about 0.4 to about 0.8 $m^2/g$.

TABLE 1

| | Example 1(A-D) | | | |
|---|---|---|---|---|
| | (A) | (B) | (C) | (D) |
| Sintering temp. | 850° C. | 900° C. | 950° C. | 1,000° C. |
| Unit cell vol. | 33.902 Å$^3$ | 33.921 Å$^3$ | 33.934 Å$^3$ | 33.957 Å$^3$ |
| Normalized c:a ratio c:a/24^0.5 | 1.0123 | 1.0122 | 1.0120 | 1.0117 |
| Cation mixing (Rietveld refinement) | 4.5% | 3.9% | 4.3% | 4.5% |

Comparative Example 1

50 g of a commercial sample having a composition of $LiNi_{0.8}Co_{0.1}Mn_{0.1}O_2$ represented by Formula $LiNi_{1-x}M_xO_2$ (x=0.3, and $M=Mn_{1/3}Ni_{1/3}Co_{1/3}$) was heated in air to 750° C. (CEx. 1A), 850° C. (CEx. 1B), 900° C. (CEx. 1C), and 950° C. (CEx. 1D) (10 hrs), respectively.

Figure 6:
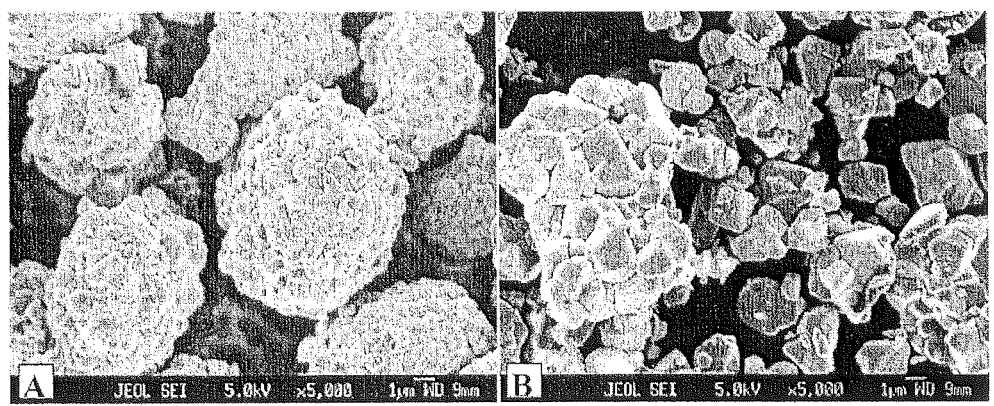
FIG. 6 is an FESEM image showing commercial LiMO$_2$ (M=Ni$_{0.8}$Co$_{0.2}$) according to Comparative Example 1. 6A: FESEM image of a sample as received, and 6B: FESEM image of a sample after heating to 850° C. in air.

X-ray analysis was carried out to obtain detailed lattice parameters with high resolution. Cation mixing was observed by Rietveld refinement, and morphology was analyzed by FESEM. The results thus obtained are given in Table 2 below. Referring to Table 2, it can be seen that all of the samples heated to a temperature of T≥750° C. (CEx. 1A-D) exhibited continuous degradation of a crystal structure (increased cation mixing, increased lattice constant and decreased c:a ratio). FIG. 6 shows a FESEM image of a commercial sample as received and a FESEM image of the same sample heated to 850° C. (CEx. 1B) in air, and it can be seen that the sample heated to a temperature of T≥850° C. (CEx. 1B-D) exhibited structural collapse. This is believed to be due to that $Li_2CO_3$, formed during heating in air, melts to thereby segregate particles.

TABLE 2

| | Comp. Ex. 1 (A-D) | | | |
|---|---|---|---|---|
| | (A) | (B) | (C) | (D) |
| Sintering temp. | 750° C. | 850° C. | 900° C. | 950° C. |
| Unit cell vol. | 33.902 Å$^3$ | 33.920 Å$^3$ | 33.934 Å$^3$ | 33.957 Å$^3$ |
| Normalized c:a ratio c:a/24^0.5 | 1.0103 | 1.0100 | 1.0090 | 1.0085 |
| Cation mixing (Rietveld refinement) | 10% | 12% | 15% | 18% |

Therefore, it can be seen that it is impossible to produce a conventional lithium mixed transition metal oxide having the above-specified composition in the air containing trace amounts of carbon dioxide, due to thermodynamic limitations. In addition, upon producing the lithium transition metal oxide having the above composition according to a conventional method, the use of $Li_2CO_3$ as a raw material is accompanied by evolution of $CO_2$ due to decomposition of $Li_2CO_3$, thereby leading to thermodynamic hindrance of additional decomposition of $Li_2CO_3$, consequently resulting in no further progression of the reaction. For these reasons, it was shown that such a conventional method cannot be applied to the practical production process.

Comparative Example 2

Figure 7:
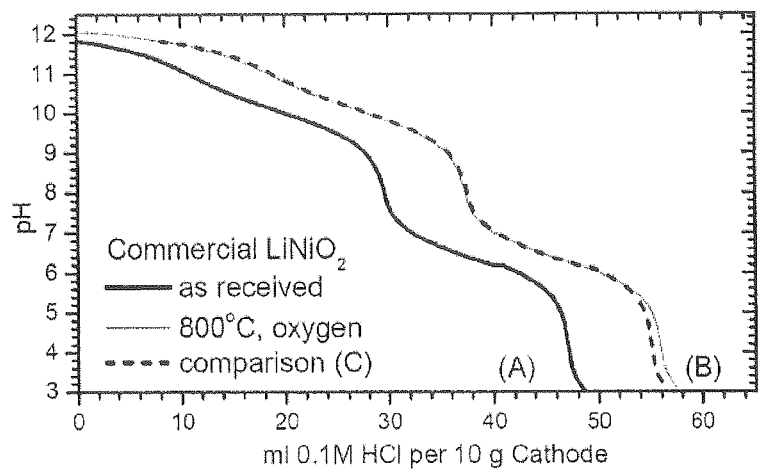
FIG. 7 is an FESEM image showing the standard pH titration curve of commercial high-Ni LiNiO$_2$ according to Comparative Example 2. A: Sample as received, B: After heating of a sample to 800° C. under an oxygen atmosphere, and C: Copy of A.

The pH titration was carried out at a flow rate of >2 L/min for 400 g of a commercial sample having a composition of $LiNi_{0.8}Co_{0.2}O_2$. The results thus obtained are given in FIG. 7. In FIG. 7, Curve A (CEx. 2A) represents pH titration for the sample as received, and Curve B (CEx. 2B) represents pH titration for the sample heated to 800° C. in a flow of pure oxygen for 24 hours. From the analysis results of pH profiles, it can be seen that the contents of $Li_2CO_3$ before and after heat treatment were the same therebetween, and there was no reaction of $Li_2CO_3$ impurities. That is, it can be seen that the heat treatment under an oxygen atmosphere resulted in no additional production of $Li_2CO_3$ impurities, but $Li_2CO_3$ impurities present in the particles were not decomposed. Through slightly increased cation mixing, a slightly decreased c:a ratio and a slightly decreased unit cell volume from the X-ray analysis results, it was found that the content of Li slightly decreased in the crystal structure of $LiNiO_2$ in conjunction with the formation of a small amount of $Li_2O$. Therefore, it can be seen that it is impossible to prepare a stoichiometric lithium mixed transition metal oxide with no impurities and no lithium-deficiency in a flow of oxygen gas or synthetic air.

Comparative Example 3

Figure 8:
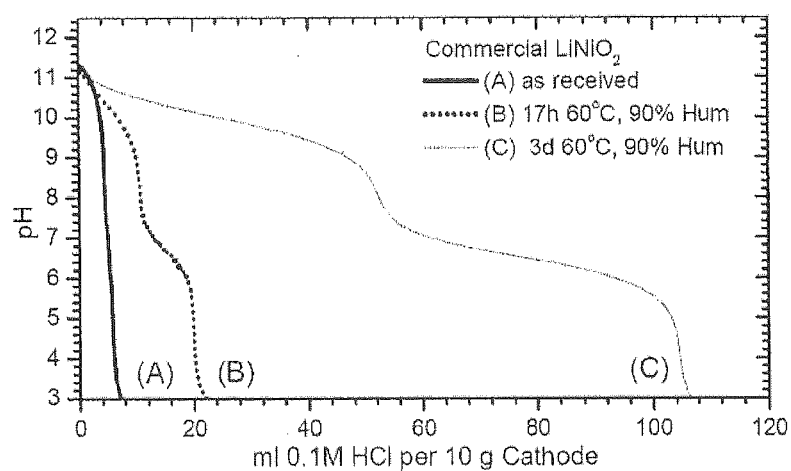
FIG. 8 is a graph showing a pH titration curve of a sample according to Comparative Example 3 during storage of the sample in a wet chamber. A: Sample as received, B: After storage of a sample for 17 hrs, and C: After storage of a sample for 3 days.

$LiAl_{0.02}Ni_{0.78}Co_{0.2}O_2$ containing less than 3% aluminum compound, as commercially available Al/Ba-modified, high-nickel $LiNiO_2$, was stored in a wet chamber (90% relative humidity, abbreviated "RH") at 60° C. in air. The pH titration was carried out for a sample prior to exposure to moisture, and samples wet-stored for 17 hrs and 3 days, respectively. The results thus obtained are given in FIG. 8. Referring to FIG. 8, an amount of water-soluble bases was low before storage, but substantial amounts of water-soluble bases, primarily comprising $Li_2CO_3$, were continuously formed upon exposure to air. Therefore, even when an initial amount of $Li_2CO_3$ impurities was low, it was revealed that the commercially available high-nickel $LiNiO_2$ is not stable in air and therefore rapidly decomposes at a substantial rate, and substantial amounts of $Li_2CO_3$ impurities are formed during storage.

Example 2

Figure 9:
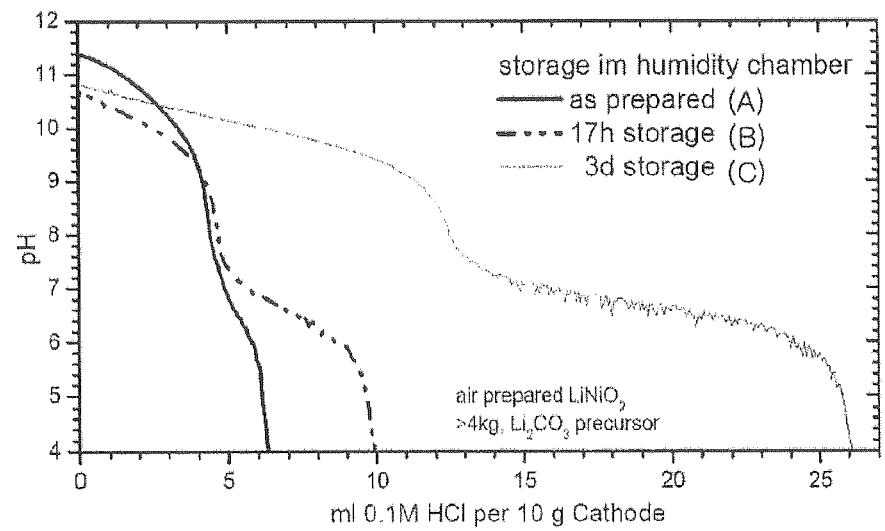
FIG. 9 is a graph showing a pH titration curve of a sample according to Example 2 during storage of the sample in a wet chamber. A: Sample as received, B: After storage of a sample for 17 hrs, and C: After storage of a sample for 3 days.

The pH titration was carried out for a sample of the lithium mixed transition metal oxide in accordance with Example 2 prior to exposure to moisture, and samples stored in a wet chamber (90% RH) at 60° C. in air for 17 hours and 3 days, respectively. The results thus obtained are given in FIG. 9. Upon comparing the lithium mixed transition metal oxide of Example 2 (see FIG. 9) with the sample of Comparative Example 3 (see FIG. 8), the sample of Comparative Example 3 (stored for 17 hours) exhibited consumption of about 20 mL of HCl, whereas the sample of Example 2 (stored for 17 hours) exhibited consumption of 10 mL of HCl, thus showing an about two-fold decrease in production of the water-soluble bases. Further, in 3-day-storage samples, the sample of Comparative Example 3 exhibited consumption of about 110 mL of HCl, whereas the sample of Example 2 exhibited consumption of 26 mL of HCl, which corresponds to an about five-fold decrease in production of the water-soluble bases. Therefore, it can be seen that the sample of Example 2 decomposed at a rate about five-fold slower than that of the sample of Comparative Example 3. Then, it can be shown that the lithium mixed transition metal oxide of Example 2 exhibits superior chemical resistance even when it is exposed to air and moisture.

Comparative Example 4

A high-nickel $LiNiO_2$ sample having a composition of $LiNi_{0.8}Mn_{0.05}Co_{0.15}O_2$, as a commercial sample which was surface-coated with $AlPO_4$ followed by gentle heat treatment, was subjected to pH titration before and after storage in a wet chamber. As a result of pH titration, 12 mL of 0.1M HCl was consumed per 10 g cathode, an initial content of $Li_2CO_3$ was low, and the content of $Li_2CO_3$ after storage was slightly lower (80 to 90%) as compared to the sample of Comparative Example 3, but a higher content of $Li_2CO_3$ was formed than in the sample of Example 2. Consequently, it was found that the aforementioned high-Ni $LiNiO_2$ shows no improvements in the stability against exposure to the air even when it was surface-coated, and also exhibits insignificant improvements in the electrochemical properties such as the cycle stability and rate characteristics.

Example 3

A mixture of $Li_2CO_3$ with mixed hydroxide of Formula MOOH (M=$Ni_{4/15}(Mn_{1/2}Ni_{1/2})_{8/15}Co_{0.2}$) was introduced into a furnace with an about 20 L chamber and sintered at 920° C. for 10 hours, during which more than 10 m³ of air was pumped into the furnace, thereby preparing about 5 kg of $LiNiMO_2$ in one batch.

Figure 10:
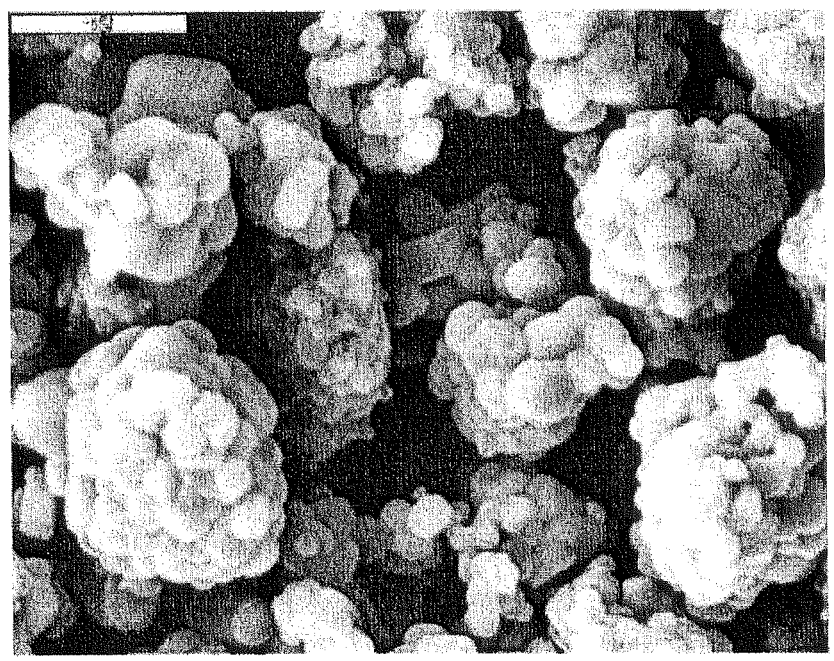
FIG. 10 is an SEM image of a sample according to Example 3.
Figure 11:
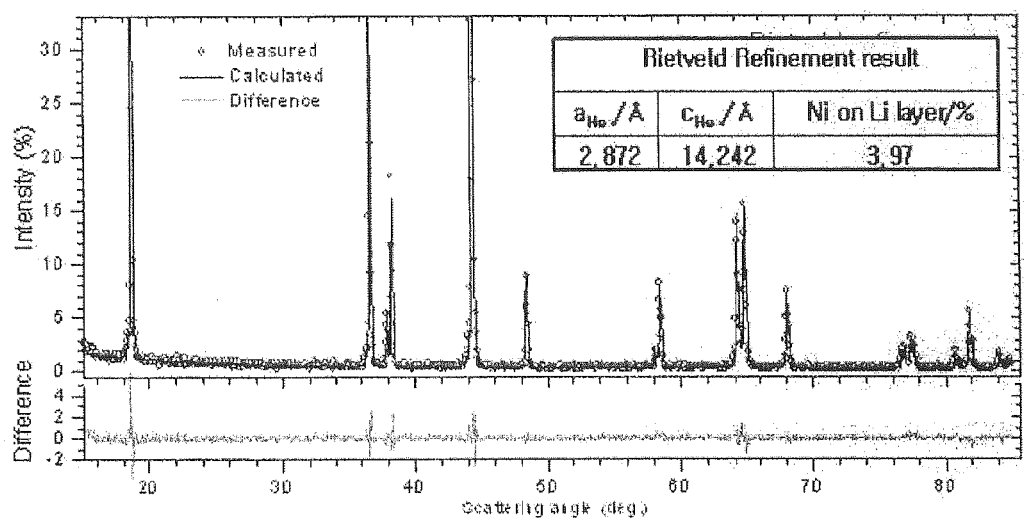
FIG. 11 shows the Rietveld refinement on X-ray diffraction patterns of a sample according to Example 3.

After sintering was complete, a unit cell constant was determined by X-ray analysis, and a unit cell volume was compared with a target value (Sample B of Example 1: 33.921 Å³). ICP analysis showed that a ratio of Li and M is very close to 1.00, and the unit cell volume was within the target range. FIG. 10 shows an SEM image of the thus-prepared cathode active material and FIG. 11 shows results of Rietveld refinement. Referring to these drawings, it was found that the sample exhibits high crystallinity and well-layered structure, a mole fraction of $Ni^{2+}$ inserted into a reversible lithium layer is 3.97%, and the calculated value and the measured value of the mole fraction of $Ni^{2+}$ are approximately the same.

Meanwhile, upon performing pH titration, less than 10 mL of 0.1M HCl was consumed to titrate 10 g of a cathode to achieve a pH of less than 5, which corresponds to a $Li_2CO_3$ impurity content of less than about 0.035 wt %. Hence, these results show that it is possible to achieve mass production of $Li_2CO_3$-free $LiNiMO_2$ having a stable crystal structure from the mixed hydroxide and $Li_2CO_3$ by a solid-state reaction.

Experimental Example 1

Test of Electrochemical Properties

Coin cells were fabricated using the lithium mixed transition metal oxide of Example 3, $LiNiMO_2$ of Comparative Examples 2 to 4, and commercial $LiMO_2$ with M= $(Ni_{1/2}Mn_{1/2})_{1-x}Co_x$ and x=0.17 (Comparative Example 5) and x=0.33 (Comparative Example 6), respectively, as a cathode, and a lithium metal as an anode. Electrochemical properties of the thus-fabricated coin cells were tested. Cycling was carried out at 25° C. and 60° C., primarily a charge rate of C/5 and a discharge rate of C/5 (1 C=150 mA/g) within a range of 3 to 4.3 V.

Experimental results of the electrochemical properties for the coin cells of Comparative Examples 2 to 4 are given in Table 3 below. Referring to Table 3, the cycle stability was poor with the exception of Comparative Example 3 (Sample B). It is believed that Comparative Example 4 (Sample C) exhibits the poor cycle stability due to the lithium-deficiency of the surface. Whereas, even though Comparative Example 2 (Sample A) and Comparative Example 3 (Sample B) were not lithium-deficient, only Comparative Example 4 (Sample C) exhibited a low content of $Li_2CO_3$. The presence of such $Li_2CO_3$ may lead to gas evolution and gradual degradation of the performance (at 4.3 V, $Li_2CO_3$ slowly decomposes with the collapse of crystals). That is, there are no nickel-based active materials meeting both the excellent cycle stability and the low-impurity content, and therefore it can be shown that the conventional nickel-based active materials suffer from poor cycle stability and low stability against exposure to air, in conjunction with a high level of $Li_2CO_3$ impurities and high production costs.

TABLE 3

| Example | Sample A | Sample B | Sample C |
|---|---|---|---|
| Substrate | $LiNi_{0.8}Co_{0.2}O_2$ Comp. Ex. 2 | Al/Ba-modified Comp. Ex. 3 | $AlPO_4$-coated Comp. Ex. 4 |
| Stoichiometric Li:M | Stoichiometric | Stoichiometric | Li-deficient at surfaces |
| $Li_2CO_3$ impurities | High | High | Low |
| Capacity at 25° C. C/10, C/1 | 193, 175 mAh/g | 195, 175 mAh/g | 185, 155 mAh/g |
| Capacity loss | 30% per 100 cycles | 11% per 100 cycles | >30% per 100 cycles |

On the other hand, the cells of Comparative Examples 5 and 6 exhibited a crystallographic density of 4.7 and 4.76 g/cm³, respectively, which were almost the same, and showed a discharge capacity of 157 to 159 mAh/g at a C/10 rate (3 to 4.3 V). Upon comparing with $LiCoO_2$ having a crystallographic density of 5.04 g/cm³ and a discharge capacity of 157 mAh/g, a volume capacity of the cell of Comparative Example 5 is equal to a 93% level of $LiCoO_2$, and the cell of Comparative Example 6 exhibits a crystallographic density corresponding to a 94% level of $LiCoO_2$. Therefore, it can be seen that a low content of Ni results in a poor volume capacity.

Whereas, a crystallographic density of $LiNiMO_2$ in accordance with Example 3 was 4.74 g/cm$^3$ (cf. $LiCoO_2$: 5.05 g/cm$^3$). A discharge capacity was more than 170 mAh/g (cf. $LiCoO_2$: 157 mAh/g) at C/20, thus representing that the volume capacity of $LiNiMO_2$ was much improved as compared to $LiCoO_2$.

Figure 12:
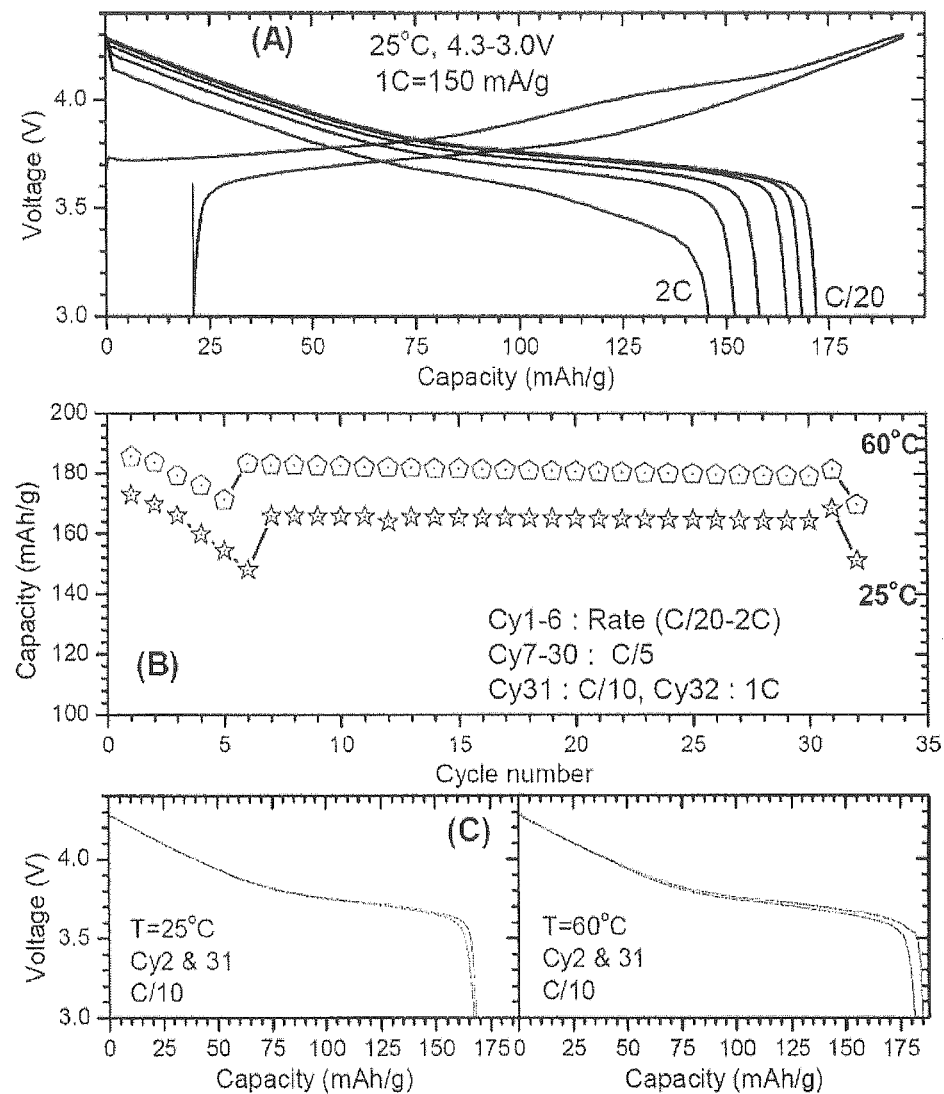
FIG. 12 is a graph showing electrochemical properties of LiNiMO$_2$ according to Example 3 in Experimental Example 1. 12A: Graph showing voltage profiles and rate characteristics at room temperature (1 to 7 cycles); 7B: Graph showing cycle stability at 25° C. and 60° C. and a rate of C/5 (3.0 to 4.3V); and 7C: Graph showing discharge profiles (at C/10 rate) for Cycle 2 and Cycle 31, obtained during cycling at 25° C. and 60° C.

Table 4 below summarizes electrochemical results of coin cells using $LiNiMO_2$ in accordance with Example 3 as a cathode, and FIG. 12 depicts voltage profiles, discharge curves and cycle stability.

TABLE 4

| Capacity retention after 100 cycles (extrapolated) C/5-C/5 cycle, 3.0-4.3 V | | Primary charge capacity 3.0-4.3 V, C/10 | Discharge capacity | | |
|---|---|---|---|---|---|
| 25° C. | 60° C. | — | 25° C., C/1 | 25° C., C/20 | 60° C., C/20 |
| >96% | >90% | >190 mAh/g | 152 mA/g | 173 mAh/g | 185 mAh/g |

Experimental Example 2

Determination of Thermal Stability

Figure 13:
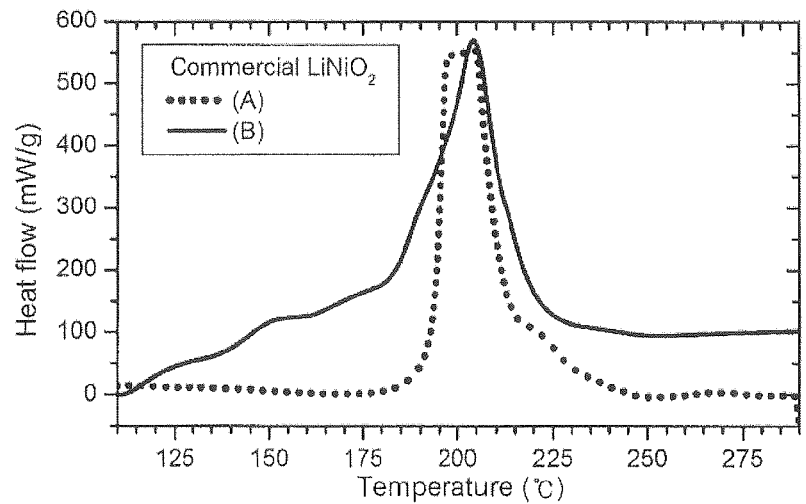
FIG. 13 is a graph showing DSC (differential scanning calorimetry) values for samples of Comparative Examples 3 and 4 in Experimental Example 2. A: Commercial Al/Ba-modified LiMO$_2$ (M=Ni) of Comparative Example 3, and B: Commercial AlPO$_4$-coated LiMO$_2$ (M=Ni) of Comparative Example 4.
Figure 14:
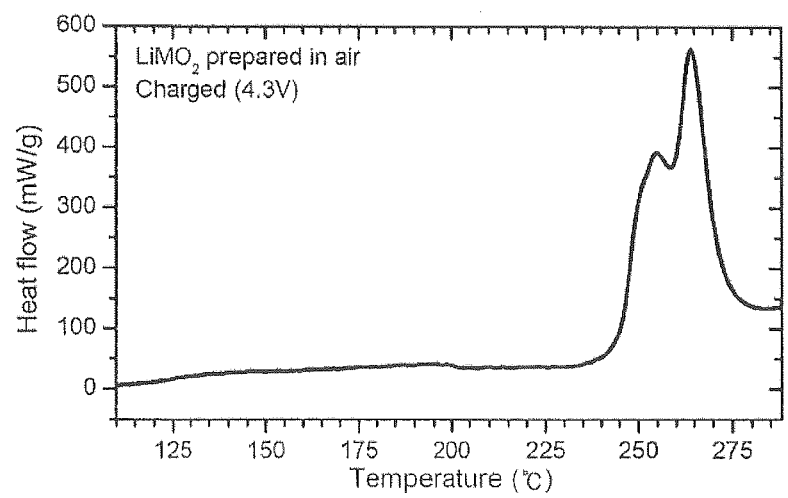
FIG. 14 is a graph showing DSC values for LiNiMO$_2$ according to Example 3 in Experimental Example 2.

In order to examine the thermal stability for the lithium mixed transition metal oxide of Example 3 and $LiNiMO_2$ in accordance with Comparative Examples 3 and 4, DSC analysis was carried out. The thus-obtained results are given in FIGS. 13 and 14. For this purpose, coin cells (anode: lithium metal) were charged to 4.3 V, disassembled, and inserted into hermetically sealed DSC cans, followed by injection of an electrolyte. A total weight of the cathode was about 50 to about 60 mg, a total weight of the electrolyte was approximately the same. Therefore, an exothermic reaction is strongly cathode-limited. The DSC measurement was carried out at a heating rate of 0.5 K/min.

As a result, Comparative Example 3 (Al/Ba-modified $LiNiO_2$) and Comparative Example 4 ($AlPO_4$-coated $LiNiO_2$) showed the initiation of a strong exothermic reaction at a relatively low temperature. Particularly, Comparative Example 3 exhibited a heat evolution that exceeds the limit of the device. The total accumulation of heat generation was large, i.e. well above 2,000 kJ/g, thus indicating a low thermal stability (see FIG. 13).

Meanwhile, $LiNiMO_2$ of Example 3 in accordance with the present invention exhibited a low total heat evolution, and the initiation of an exothermic reaction at a relatively high temperature (about 260° C.) as compared to Comparative Examples 3 and 4 (about 200° C.) (see FIG. 14). Therefore, it can be seen that the thermal stability of $LiNiMO_2$ in accordance with the present invention is excellent.

Experimental Example 3

Test of Electrochemical Properties of Polymer Cells with Application of Lithium Mixed Transition Metal Oxide Using the lithium mixed transition metal oxide of Example 3 as a cathode active material, a pilot plant polymer cell of 383562 type was fabricated. For this purpose, the cathode was mixed with 17% by weight $LiCoO_2$, and the cathode slurry was NMP/PVDF-based slurry. No additives for the purpose of preventing gelation were added. The anode was a mesocarbon microbead (MCMB) anode. The electrolyte was a standard commercial electrolyte free of additives known to reduce excessive swelling. Experiments were carried out at 60° C. and charge and discharge rates of C/5. A charge voltage was from 3.0 to 4.3 V.

Figure 15:
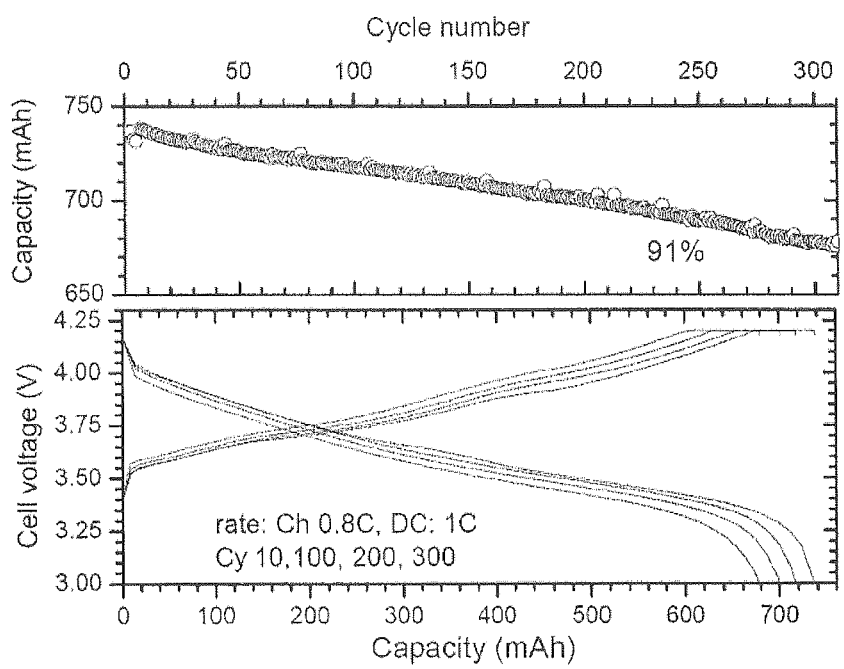
FIG. 15 is a graph showing electrophysical properties of a polymer cell according to one embodiment in Experimental Example 3.
Figure 16:
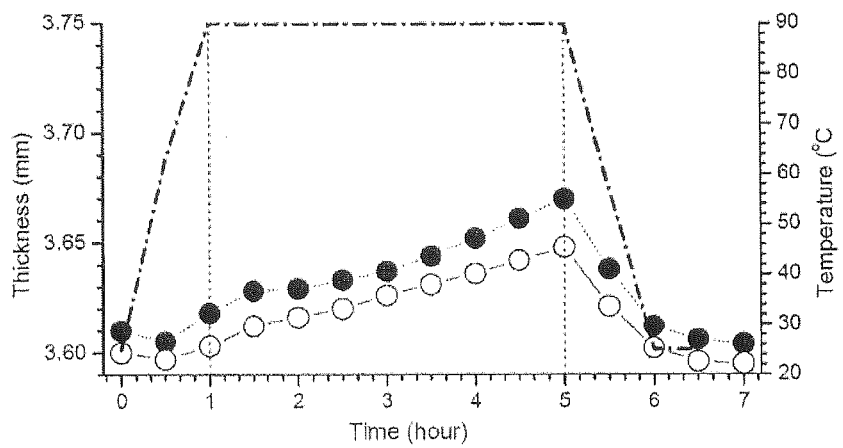
FIG. 16 is a graph showing swelling of a polymer cell during high-temperature storage in Experimental Example 3.

FIG. 15 shows the cycle stability of the battery of the present invention (0.8 C charge, 1 C discharge, 3 to 4 V, 2 V) at 25° C. An exceptional cycle stability (91% at C/1 rate after 300 cycles) was achieved at room temperature. The impedance build up was low. Also, the gas evolution during storage was measured. The result thus obtained are given in FIG. 16. During a 4 h-90° C. fully charged (4.2 V) storage, a very small amount of gas was evolved and only a small increase of thickness was observed. The increase of thickness was within or less than the value expected for good $LiCoO_2$ cathodes tested in similar cells under similar conditions. Therefore, it can be seen that $LiNiMO_2$ in accordance with the present invention exhibits very high stability and chemical resistance.

Experimental Example 4

Samples with different Li:M molar ratios were prepared from Formula MOOH (M=$Ni_{4/15}(Mn_{1/2}Ni_{1/2})_{8/15}Co_{0.2}$). $Li_2CO_3$ was used as a lithium source. 7 samples each of about 50 g with Li:M ratios ranging from 0.925 to 1.125 were prepared by a sintering process in air at a temperature of 910 to 920° C. Then, electrochemical properties were tested.

Figure 17:
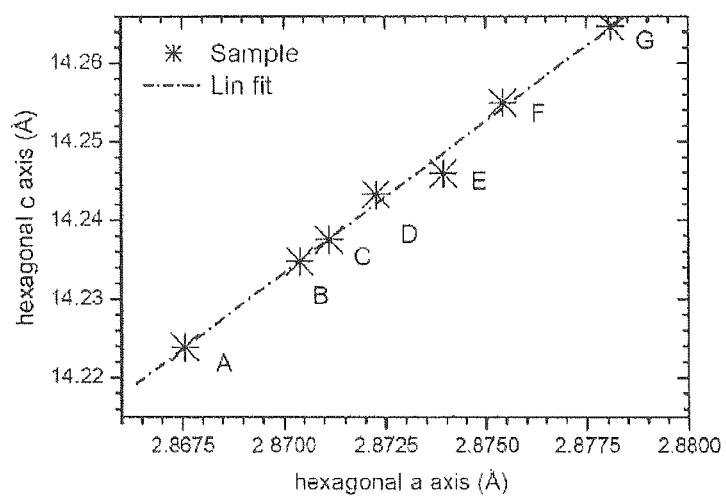
FIG. 17 is a graph showing lengths of a-axis and c-axis of crystallographic unit cells of samples having different molar ratios of Li:M in Experimental Example 4.

Table 5 below provides the obtained crystallographic data. The unit cell volume changes smoothly according to the Li:M ratio. FIG. 17 shows its crystallographic map. All samples are located on a straight line. According to the results of pH titration, the content of soluble base increases slightly with an increase of the Li:M ratio. The soluble base probably originates from the surface basicity (ion exchange) but not from the dissolution of $Li_2CO_3$ impurities as observed in Comparative Example 1.

Therefore, this experiment clearly shows that the lithium mixed transition metal oxide prepared by the method in accordance with the present invention is in the Li stoichiometric range and additional Li is inserted into the crystal structure. In addition, it can be seen that stoichiometric samples without $Li_2CO_3$ impurity can be obtained even when $Li_2CO_3$ is used as a precursor and the sintering is carried out in air.

That is, as the Li/M ratio decreases, the amount of $Ni^{2+}$ inserted into the reversible lithium layer gradually increases. Insertion of excessively large amounts of $Ni^{2+}$ into the reversible lithium layer hinders the movement of $Li^+$ during the charge/discharge process, thereby resulting in decreased capacity or poor rate characteristics. On the other hand, if the Li/M ratio is excessively high, the amount of $Ni^{2+}$ inserted into the reversible lithium layer is too low, which may result in structural instability leading to deterioration of the battery safety and lifespan characteristics. Further, at the high Li/M value, amounts of unreacted $Li_2CO_3$ increase to thereby result in a high pH-titration value. Therefore, upon considering the performance and safety of the battery, the ratio of Li:M is particularly preferably in a range of 0.95 to 1.04 (Samples B, C and D) to ensure that the value of $Ni^{2+}$ inserted into the lithium layer is in a range of 3 to 7%.

TABLE 5

| | Samples | | | | | | |
|---|---|---|---|---|---|---|---|
| | A | B | C | D | E | F | G |
| Li:M ratio | 0.925 | 0.975 | 1.0 | 1.025 | 1.05 | 1.075 | 1.125 |
| Unit cell vol. | 34.111 Å$^3$ | 34.023 Å$^3$ | 33.923 Å$^3$ | 33.921 Å$^3$ | 33.882 Å$^3$ | 33.857 Å$^3$ | 33.764 Å$^3$ |
| c:a ratio | 1.0116 | 1.0117 | 1.0119 | 1.0122 | 1.0122 | 1.0123 | 1.0125 |
| Cation mixing | 8.8% | 6.6% | 4.7% | 4.0% | 2.1% | 2.5% | 1.4% |
| pH titration | 3 | 3.5 | 5 | 9 | 15 | 19 | 25 |

Example 4

A mixed hydroxide of Formula MOOH (M=$Ni_{4/15}$ $(Mn_{1/2}Ni_{1/2})_{8/15}Co_{0.2}$) as a mixed transition metal precursor and $Li_2CO_3$ were mixed in a molar ratio of Li:M=1.01:1, and the mixture was sintered in air at 900° C. for 10 hours, thereby preparing 50 g of a lithium mixed transition metal oxide having a composition of $LiNi_{0.53}Co_{0.2}Mn_{0.27}O_2$.

X-ray analysis was carried out to obtain detailed lattice parameters with high resolution. Cation mixing was observed by Rietveld refinement. The results thus obtained are given in Table 6 below.

Comparative Example 7

A lithium transition metal oxide was prepared in the same manner as in Example 4, except that a molar ratio of Li:M was set to 1:1 and sintering was carried out under an $O_2$ atmosphere. Then, X-ray analysis was carried out and the cation mixing was observed. The results thus obtained are given in Table 6 below.

TABLE 6

| | Ex. 4 | Comp. Ex. 7 |
|---|---|---|
| Li:M | 1.01:1 | 1:1 |
| Unit cell vol. | 33.921 Å$^3$ | 33.798 Å$^3$ |
| Normalized c:a ratio c:a/24^0.5 | 1.0122 | 1.0124 |
| Cation mixing | 4.6% | 1.5% |

As can be seen from Table 6, the lithium transition metal oxide of Comparative Example 7 exhibited a significantly low cation mixing ratio due to the heat treatment under the oxygen atmosphere. This case suffers from deterioration of the structural stability. That is, it can be seen that the heat treatment under the oxygen atmosphere resulted in the development of a layered structure due to excessively low cation mixing, but migration of $Ni^{2+}$ ions was hindered to an extent that the cycle stability of the battery is arrested.

Example 5

A lithium mixed transition metal oxide having a composition of $LiNi_{0.4}Co_{0.3}Mn_{0.3}O_2$ was prepared in the same manner as in Example 4, except that a mixed hydroxide of Formula MOOH (M=$Ni_{1/10}(Mn_{1/2}Ni_{1/2})_{6/10}Co_{0.3}$) was used as a mixed transition metal precursor, and the mixed hydroxide and $Li_2CO_3$ were mixed in a ratio of Li:M=1:1. The cation mixing was observed by X-ray analysis and Rietveld refinement. The results thus obtained are given in Table 7 below.

TABLE 7

| Li:M | 1:1 |
|---|---|
| Unit cell vol. | 33.895 Å$^3$ |
| Normalized c:a ratio | 1.0123 |
| c:a/24^0.5 | |
| Cation mixing | 3% |
| Capacity (mAh/g) | 155 |

Example 6

A lithium mixed transition metal oxide having a composition of $LiNi_{0.65}Co_{0.2}Mn_{0.15}O_2$ was prepared in the same manner as in Example 4, except that a mixed hydroxide of Formula MOOH (M=$Ni_{5/10}(Mn_{1/2}Ni_{1/2})_{3/10}Co_{0.2}$) was used as a mixed transition metal precursor, and the mixed hydroxide and $Li_2CO_3$ were mixed in a molar ratio of Li:M=1:1. The cation mixing was observed by X-ray analysis and Rietveld refinement. The results thus obtained are given in Table 8 below.

TABLE 8

| Li:M | 1:1 |
|---|---|
| Unit cell vol. | 34.025 Å$^3$ |
| Normalized c:a ratio | 1.0107 |
| c:a/24^0.5 | |
| Cation mixing | 7% |
| Capacity (mAh/g) | 172 |

From the results shown in Tables 7 and 8, it can be seen that the lithium mixed transition metal oxide in accordance with the present invention provides desired effects, as discussed hereinbefore, in a given range.

INDUSTRIAL APPLICABILITY

As apparent from the above description, a lithium mixed transition metal oxide in accordance with the present invention has a specified composition and interconnection of MO layers via the insertion of a portion of MO layer-derived Ni ions into reversible lithium layers, whereby the crystal structure can be stably supported to thereby prevent the deterioration of cycle characteristics. In addition, such a lithium mixed transition metal oxide exhibits a high battery capacity and is substantially free of impurities such as water-soluble bases, thereby providing excellent storage stability, decreased gas evolution and consequently superior high-temperature stability.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cathode active material comprising: a lithium transition metal oxide of the general formula $$Li_x((Ni_{1-a-b}(Ni_{1/2}Mn_{1/2})_aCo_b)_{1-k}A_k)_{2-x}O_2,$$

wherein
0.65≤a+b≤0.85, 0.1≤b≤0.4,
A is a dopant,
0≤k<0.05, and
0.95≤x≤1.05,
said lithium transition metal oxide being substantially free of soluble bases such that less than about 20 ml of 0.1M HCl is necessary to titrate 200 ml of a solution containing substantially all of the soluble bases present in 10 g of said lithium transition metal oxide to a pH less than 5, said solution being prepared by repeated soaking and decanting of said lithium transition metal oxide.

2. The cathode active material of claim 1, wherein the lithium mixed transition metal oxide has a $Li_2CO_3$ content of less than 0.2% by weight of the cathode active material.

3. The cathode active material of claim 1, wherein said lithium transition metal oxide has a unit cell volume from 33.764 Å³ to 34.111 Å³.

4. The cathode active material of claim 3, wherein said unit cell volume is from 33.764 Å³ to 34.023 Å³.

5. The cathode active material of claim 1, wherein a crystallographic density of the lithium transition metal oxide is 4.74 g/cm³.

6. A cathode active material comprising: a lithium transition metal oxide of the general formula $$Li_x((Ni_{1-a-b}(Ni_{1/2}Mn_{1/2})_aCo_b)_{1-k}A_k)_{2-x}O_2,$$

wherein
0.65≤a+b≤0.85, 0.1≤b≤0.4,
A is a dopant,
0≤k<0.05, and
0.95≤x≤1.05,
wherein said cathode active material has a $Li_2CO_3$ impurity content of about 0.2% by weight or less.

7. The cathode active material of claim 6, wherein said lithium transition metal oxide is substantially free of soluble bases such that less than about 20 ml of 0.1M HCl is necessary to titrate 200 ml of a solution containing substantially all of the soluble bases present in 10 g of said lithium transition metal oxide to a pH less than 5, said solution being prepared by repeated soaking and decanting of said lithium transition metal oxide.

8. A cathode active material comprising: a lithium transition metal oxide of the general formula $$Li_x((Ni_{1-a-b}(Ni_{1/2}Mn_{1/2})_aCo_b)_{1-k}A_k)_{2-x}O_2,$$

wherein
0.65≤a+b≤0.85, 0.1≤b≤0.4,
A is a dopant,
0≤k<0.05, and
0.95≤x≤1.05,
wherein said lithium transition metal oxide has a c:a ratio from 1.0117 to 1.0125.

9. A cathode active material comprising: a lithium transition metal oxide of the general formula $$Li_x((Ni_{1-a-b}(Ni_{1/2}Mn_{1/2})_aCo_b)_{1-k}A_k)_{2-x}O_2,$$

wherein
0.65≤a+b≤0.85, 0.1≤b≤0.4,
A is a dopant,
0≤k<0.05, and
0.95≤x≤1.05,
wherein said lithium transition metal oxide has cation mixing from 1.4% to 3.9% as measured by Reitveld refinement.

10. The cathode active material of claim 9, wherein said cation mixing is from 1.4% to 2.5%.

11. The cathode active material of claim 9, wherein said cation mixing is from 1.4 to 2.1%.

12. The cathode active material of claim 9, wherein said lithium transition metal oxide has a unit cell volume from 33.764 Å³ to 34.111 Å³.

13. The cathode active material of claim 9, wherein said unit cell volume is from 33.764 Å³ to 34.023 Å³.

14. The cathode active material of claim 9, wherein a crystallographic density of the lithium transition metal oxide is 4.74 g/cm³.

15. A cathode active material comprising: a lithium transition metal oxide of the general formula $$Li_x((Ni_{1-a-b}(Ni_{1/2}Mn_{1/2})_aCo_b)_{1-k}A_k)_{2-x}O_2,$$

wherein
0.65≤a+b≤0.85, 0.1≤b≤0.4,
A is a dopant,
0≤k<0.05, and
0.95≤x≤1.05,
wherein said lithium transition metal oxide has a unit cell volume from 33.764 Å³ to 34.111 Å³.

16. The cathode active material of claim 15, wherein said unit cell volume is from 33.764 Å³ to 34.023 Å³.

17. A lithium secondary battery comprising: (a) an anode; (b) an electrolyte; and (c) a cathode, said cathode comprising a cathode active material having a lithium transition metal oxide of the general formula $$Li_x((Ni_{1-a-b}(Ni_{1/2}Mn_{1/2})_aCo_b)_{1-k}A_k)_{2-x}O_2,$$

wherein
0.65≤a+b≤0.85, 0.1≤b≤0.4,
A is a dopant,
0≤k<0.05, and
0.95≤x≤1.05,
said lithium transition metal oxide being substantially free of soluble bases such that less than 20 ml of 0.1M HCl is necessary to titrate 200 ml of a solution containing substantially all of the soluble bases present in 10 g of said lithium transition metal oxide to a pH less than 5, said solution being prepared by repeated soaking and decanting of said lithium transition metal oxide, wherein the battery has a discharge capacity greater than 170 mAh/g at C/20 where 1C=150 mA/g of said lithium transition metal oxide cathode active material.

18. The battery of claim 17, wherein said cathode active material has a crystallographic density of 4.74 g/cm³.

19. A lithium secondary battery comprising the cathode active material of claim 1.

20. A lithium secondary battery comprising the cathode active material of claim 8.

21. A lithium secondary battery comprising the cathode active material of claim 15.

* * * * *